US012777194B2

(12) United States Patent
Jang et al.

(10) Patent No.: US 12,777,194 B2
(45) Date of Patent: *Oct. 27, 2026

(54) IMAGE ENCODING/DECODING METHOD AND APPARATUS FOR PERFORMING IN-LOOP FILTERING ON BASIS OF SUB-PICTURE STRUCTURE, AND METHOD FOR TRANSMITTING BITSTREAM

(71) Applicant: LG ELECTRONICS INC., Seoul (KR)

(72) Inventors: Hyeong Moon Jang, Seoul (KR); Seethal Paluri, Seoul (KR); Hendry Hendry, Seoul (KR); Jung Hak Nam, Seoul (KR)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 71 days.

This patent is subject to a terminal disclaimer.

(21) Appl. No.: 18/818,451

(22) Filed: Aug. 28, 2024

(65) Prior Publication Data

US 2025/0063205 A1 Feb. 20, 2025

Related U.S. Application Data

(63) Continuation of application No. 17/766,954, filed as application No. PCT/KR2020/013595 on Oct. 6, 2020, now Pat. No. 12,096,041.

(Continued)

(51) Int. Cl.
*H04N 19/82* (2014.01)
*H04N 19/117* (2014.01)
(Continued)

(52) U.S. Cl.
CPC .......... *H04N 19/82* (2014.11); *H04N 19/117* (2014.11); *H04N 19/174* (2014.11);
(Continued)

(58) Field of Classification Search
CPC .. H04N 19/117; H04N 19/119; H04N 19/174; H04N 19/176; H04N 19/184;
(Continued)

(56) References Cited

U.S. PATENT DOCUMENTS 12,096,041 B2 * 9/2024 Jang ........................ H04N 19/86
2022/0303587 A1 * 9/2022 Lai ........................ H04N 19/172

* cited by examiner

*Primary Examiner* — Kathleen M Walsh
(74) *Attorney, Agent, or Firm* — Cozen O'Connor

(57) ABSTRACT

An image encoding/decoding method and apparatus are provided. An image decoding method performed by an image decoding apparatus comprises decoding a first flag specifying whether in-loop filtering is able to be performed across a boundary of a subpicture from a bitstream and performing the in-loop filtering on a boundary of a current block, based on the first flag. Based on the boundary of the current block being a boundary of a current subpicture including the current block, the in-loop filtering on the boundary of the current block is not performed, based on the first flag for the current subpicture specifying that the in-loop filtering is not able to be performed across the boundary of the current subpicture or the first flag for an adjacent subpicture adjacent to the boundary of the current block specifying that the in-loop filtering is not able to be performed across the boundary of the adjacent subpicture.

14 Claims, 28 Drawing Sheets

Related U.S. Application Data

(60) Provisional application No. 62/960,685, filed on Jan. 13, 2020, provisional application No. 62/960,124, filed on Jan. 12, 2020, provisional application No. 62/912,605, filed on Oct. 8, 2019, provisional application No. 62/911,956, filed on Oct. 7, 2019.

(51) Int. Cl.

| | |
|---|---|
| ***H04N 19/174*** | (2014.01) |
| ***H04N 19/176*** | (2014.01) |
| ***H04N 19/46*** | (2014.01) |
| ***H04N 19/86*** | (2014.01) |

(52) U.S. Cl.
CPC ........... *H04N 19/176* (2014.11); *H04N 19/46* (2014.11); *H04N 19/86* (2014.11)

(58) Field of Classification Search
CPC ........ H04N 19/46; H04N 19/70; H04N 19/82; H04N 19/86
USPC ..................................................... 375/240.29
See application file for complete search history.

FIG. 14

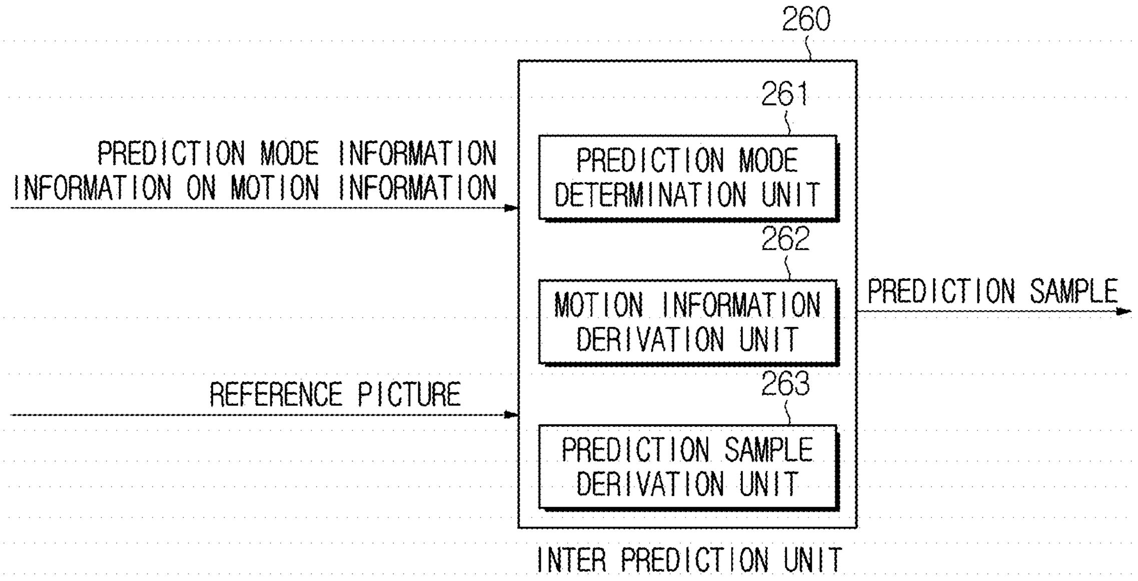

FIG. 15

| seq_parameter_set_rbsp( ) { | **Descriptor** |
|---|---|
| **sps_decoding_parameter_set_id** | u(4) |
| … | |
| **pic_width_max_in_luma_samples** | ue(v) |
| **pic_height_max_in_luma_samples** | ue(v) |
| **subpics_present_flag** | u(1) |
| if( subpics_present_flag ) { | |
| **max_subpics_minus1** | u(8) |
| **subpic_grid_col_width_minus1** | u(v) |
| **subpic_grid_row_height_minus1** | u(v) |
| for( i = 0; i < NumSubPicGridRows; i++ ) | |
| for( j = 0; j < NumSubPicGridCols; j++ ) | |
| **subpic_grid_idx**[ i ][ j ] | u(v) |
| for( i = 0; i <= NumSubPics; i++ ) { | |
| **subpic_treated_as_pic_flag**[ i ] | u(1) |
| **loop_filter_across_subpic_enabled_flag**[ i ] | u(1) |
| } | |
| } | |
| … | |

FIG. 16

```
NumSubPics = 0
for( i = 0; i. < NumSubPicGridRows; i++ ) {
    for( j = 0; j < NumSubPicGridCols; j++ ) {
        if ( i = = 0)
            SubPicTop[ subpic_grid_idx[ i ][ j ] ] = 0
        else if( subpic_grid_idx[ i ][ j ] != subpic_grid_idx[ i - 1 ][ j ] ) {
            SubPicTop[ subpic_grid_idx[ i ][ j ] ] = i
            SubPicHeight[ subpic_grid_idx[ i - 1 ][ j ] ] = i - SubPicTop[ subpic_grid_idx[ i - 1 ][ j ] ]
        }
        if ( j = = 0)
            SubPicLeft[ subpic_grid_idx[ i ][ j ] ] = 0
        else if (subpic_grid_idx[ i ][ j ] != subpic_grid_idx[ i ][ j - 1 ] ) {
            SubPicLeft[ subpic_grid_idx[ i ][ j ] ] = j
            SubPicWidth[ subpic_grid_idx[ i ][ j ] ] = j - SubPicLeft[ subpic_grid_idx[ i ][ j - 1 ] ]
        }
        if ( i = = NumSubPicGridRows - 1)
            SubPicHeight[ subpic_grid_idx[ i ][ j ] ] = i - SubPicTop[ subpic_grid_idx[ i - 1 ][ j ] ] + 1
        if (j = = NumSubPicGridRows - 1)
            SubPicWidth[ subpic_grid_idx[ i ][ j ] ] = j - SubPicLeft[ subpic_grid_idx[ i ][ j - 1 ] ] + 1
        if( subpic_grid_idx[ i ][ j ] > NumSubPics)
            NumSubPics = subpic_grid_idx[ i ][ j ]
    }
}
```

FIG. 17

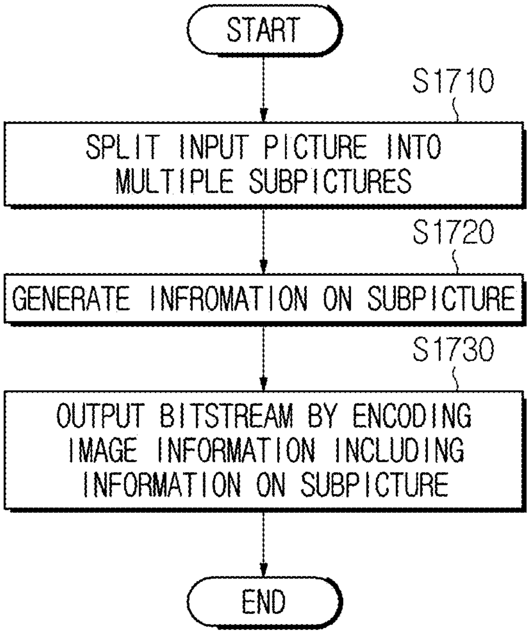

FIG. 25

| | seq_parameter_set_rbsp( ) { | Descriptor |
|---|---|---|
| | **sps_decoding_parameter_set_id** | u(4) |
| | **sps_video_parameter_set_id** | u(4) |
| | … | |
| | **subpics_present_flag** | u(1) |
| | if( subpics_present_flag ) { | |
| | **max_subpics_minus1** | u(8) |
| | **subpic_grid_col_width_minus1** | u(v) |
| | **subpic_grid_row_height_minus1** | u(v) |
| | for( i = 0; i < NumSubPicGridRows; i++ ) | |
| | for( j = 0; j < NumSubPicGridCols; j++ ) | |
| | **subpic_grid_idx[ i ][ j ]** | u(v) |
| | for( i = 0; i <= NumSubPics; i++ ) { | |
| | **subpic_treated_as_pic_flag[ i ]** | u(1) |
| 2510 | if( !subpic_treated_as_pic_flag[ i ] ) | |
| | **loop_filter_across_subpic_enabled_flag[ i ]** | u(1) |
| | } | |
| | } | |
| | … | |
| | } | |

FIG. 26

Filtering process for a luma sample using long filters

When nDp is greater than 0 and one or more of the following conditions are true, nDp is set equal to 0:

- cu_transquant_bypass_flag of the coding unit that includes the coding block containing the sample $p_0$ is equal to 1.
- pred_mode_plt_flag of the coding unit that includes the coding block containing the sample $p_0$ is equal to 1.
- Edges that coincide with the boundaries of the subpicture and subpic_treated_as_pic_flag[ SubPicIdx ] of the coding unit that includes the coding block containing the sample $p_0$ is equal to 1, When nDq is greater than 0 and one or more of the following conditions are true, nDq is set equal to 0:

- cu_transquant_bypass_flag of the coding unit that includes the coding block containing the sample $q_0$ is equal to 1.
- pred_mode_plt_flag of the coding unit that includes the coding block containing the sample $q_0$ is equal to 1.

FIG. 27

Filtering process for a luma sample using long filters

When one or more of the following conditions are true, the filtered sample value, $p_i'$ is substituted by the corresponding input sample value $p_i$ with i = 0..maxFilterLengthP − 1:

– cu_transquant_bypass_flag of the coding unit that includes the coding block containing the sample $p_i$ is equal to 1.

– pred_mode_plt_flag of the coding unit that includes the coding block containing the sample $p_i$ is equal to 1.

– Edges that coincide with the boundaries of the subpicture and subpic_treated_as_pic_flag [ SubPicIdx ] of the coding unit that includes the coding block containing the sample $p_0$ is equal to 1, When one or more of the following conditions are true, the filtered sample value, $q_j'$ is substituted by the corresponding input sample value $q_j$ with j = 0..maxFilterLengthQ − 1:

– cu_transquant_bypass_flag of the coding unit that includes the coding block containing the sample $q_j$ is equal to 1.

– pred_mode_plt_flag of the coding unit that includes the coding block containing the sample $q_j$ is equal to 1.

FIG. 28

Filtering process for a chroma sample

This process is only invoked when ChromaArrayType is not equal to 0.

Inputs to this process are:

- the variable maxFilterLength,
- the chroma sample values $p_i$ and $q_i$ with i = 0..maxFilterLengthCbCr,
- the chroma locations of $p_i$ and $q_i$, ( $xP_i$, $yP_i$ ) and ( $xQ_i$, $yQ_i$ ) with i = 0..maxFilterLengthCbCr − 1,
- a variable $t_C$.

Outputs of this process are the filtered sample values $p_i'$ and $q_i'$ with i = 0..maxFilterLengthCbCr − 1.

The filtered sample values $p_i'$ and $q_i'$ with i = 0..maxFilterLengthCbCr − 1 are derived as follows:

- If maxFilterLengthCbCr is equal to 3, the following strong filtering applies:

$p_0' = \text{Clip3}( p_0 - t_C, p_0 + t_C, ( p_3 + p_2 + p_1 + 2 * p_0 + q_0 + q_1 + q_2 + 4 ) >> 3 )$ $p_1' = \text{Clip3}( p_1 - t_C, p_1 + t_C, ( 2 * p_3 + p_2 + 2 * p_1 + p_0 + q_0 + q_1 + 4 ) >> 3 )$ $p_2' = \text{Clip3}( p_2 - t_C, p_2 + t_C, ( 3 * p_3 + 2 * p_2 + p_1 + p_0 + q_0 + 4 ) >> 3 )$ $q_0' = \text{Clip3}( q_0 - t_C, q_0 + t_C, ( p_2 + p_1 + p_0 + 2 * q_0 + q_1 + q_2 + q_3 + 4 ) >> 3 )$ $q_1' = \text{Clip3}( q_1 - t_C, q_1 + t_C, ( p_1 + p_0 + q_0 + 2 * q_1 + q_2 + 2 * q_3 + 4 ) >> 3 )$ $q_2' = \text{Clip3}( q_2 - t_C, q_2 + t_C, ( p_0 + q_0 + q_1 + 2 * q_2 + 3 * q_3 + 4 ) >> 3 )$

- Otherwise, the following weak filtering applies:

$\Delta = \text{Clip3}( -t_C, t_C, ( ( ( ( q_0 - p_0 ) << 2 ) + p_1 - q_1 + 4 ) >> 3 ) )$ $p_0' = \text{Clip1}_C( p_0 + \Delta )$ $q_0' = \text{Clip1}_C( q_0 - \Delta )$ When one or more of the following conditions are true, the filtered sample value, $p_i'$ is substituted by the corresponding input sample value $p_i$ with i = 0..maxFilterLengthCbCr − 1:

- cu_transquant_bypass_flag of the coding unit that includes the coding block containing the sample $p_i$ is equal to 1.
- pred_mode_plt_flag of the coding unit that includes the coding block containing the sample $p_i$ is equal to 1.
- Edges that coincide with the boundaries of the subpicture and subpic_treated_as_pic_flag [ SubPicIdx ] of the coding unit that includes the coding block containing the sample $p_0$ is equal to 1, When one or more of the following conditions are true, the filtered sample value, $q_i'$ is substituted by the corresponding input sample value $q_i$ with i = 0..maxFilterLengthCbCr − 1:

- cu_transquant_bypass_flag of the coding unit that includes the coding block containing the sample $q_i$ is equal to 1.
- pred_mode_plt_flag of the coding unit that includes the coding block containing the sample $q_i$ is equal to 1.

FIG. 30

Deblocking filter process for one direction

The variable filterEdgeFlag is derived as follows:

- If edgeType is equal to EDGE_VER and one or more of the following conditions are true, filterEdgeFlag is set equal to 0:
  - The left boundary of the current coding block is the left boundary of the picture.
  - The left boundary of the current coding block is the left boundary of the subpicture and loop_filter_across_subpic_enabled_flag[ SubPicIdx ] is equal to 0.
  - The left boundary of the current coding block is the left boundary of the tile and loop_filter_across_tiles_enabled_flag is equal to 0.
  - The left boundary of the current coding block is the left boundary of the slice and loop_filter_across_slices_enabled_flag is equal to 0.
  - The left boundary of the current coding block is one of the vertical virtual boundaries of the picture and VirtualBoundariesDisabledFlag is equal to 1.
- Otherwise, if edgeType is equal to EDGE_HOR and one or more of the following conditions are true, the variable filterEdgeFlag is set equal to 0:
  - The top boundary of the current luma coding block is the top boundary of the picture.
  - The top boundary of the current coding block is the top boundary of the subpicture and loop_filter_across_subpic_enabled_flag[ SubPicIdx ] is equal to 0.
  - The top boundary of the current coding block is the top boundary of the tile and loop_filter_across_tiles_enabled_flag is equal to 0.
  - The top boundary of the current coding block is the top boundary of the slice and loop_filter_across_slices_enabled_flag is equal to 0.
  - The top boundary of the current coding block is one of the horizontal virtual boundaries of the picture and VirtualBoundariesDisabledFlag is equal to 1.
- Otherwise, filterEdgeFlag is set equal to 1.

FIG. 31

Filtering process for a luma sample using short filters

- When nDp is greater than 0 and pred_mode_plt_flag of the coding unit that includes the coding block containing the sample $p_0$ is equal to 1, nDp is set equal to 0

- When nDq is greater than 0 and pred_mode_plt_flag of the coding unit that includes the coding block containing the sample $q_0$ is equal to 1, nDq is set equal to 0:

- When loop_filter_across_subpic_enabled_flag[ subPicIdxP ] is equal to 0, wherein subPicIdxP is the subpicture index containing the sample $p_i$. The filtered sample value, $p_i'$ is substituted by the corresponding input sample value $p_i$ with i = 0..maxFilterLengthP − 1.

FIG. 32

Filtering process for a luma sample using long filters

- When pred_mode_plt_flag of the coding unit that includes the coding block containing the sample $p_i$ is equal to 1, the filtered sample value, $p_i'$ is substituted by the corresponding input sample value $p_i$ with $i = 0..maxFilterLengthP - 1$.
- When pred_mode_plt_flag of the coding unit that includes the coding block containing the sample $q_i$ is equal to 1, the filtered sample value, $q_j'$ is substituted by the corresponding input sample value $q_j$ with $j = 0..maxFilterLengthQ - 1$.
- When loop_filter_across_subpic_enabled_flag[ subPicIdxP ] is equal to 0, wherein subPicIdxP is the subpicture index containing the sample $p_i$. The filtered sample value, $p_i'$ is substituted by the corresponding input sample value $p_i$ with $i = 0..maxFilterLengthP - 1$.

FIG. 33

Filtering process for a chroma sample

- When pred_mode_plt_flag of the coding unit that includes the coding block containing the sample $p_i$ is equal to 1, the filtered sample value, $p_i'$ is substituted by the corresponding input sample value $p_i$ with $i = 0..maxFilterLengthP - 1$.
- When pred_mode_plt_flag of the coding unit that includes the coding block containing the sample $q_i$ is equal to 1, the filtered sample value, $q_j'$ is substituted by the corresponding input sample value $q_j$ with $j = 0..maxFilterLengthQ - 1$:
- When loop_filter_across_subpic_enabled_flag[ subPicIdxP ] is equal to 0, wherein subPicIdxP is the subpicture index containing the sample $p_i$. The filtered sample value, $p_i'$ is substituted by the corresponding input sample value $p_i$ with $i = 0..maxFilterLengthP - 1$.

FIG. 35

Deblocking filter process for one direction

The variable filterEdgeFlag is derived as follows:

– If edgeType is equal to EDGE_VER and one or more of the following conditions are true, filterEdgeFlag is set equal to 0:

– The left boundary of the current coding block is the left boundary of the picture.

– The left boundary of the current coding block is the left boundary of the tile and loop_filter_across_tiles_enabled_flag is equal to 0.

– The left boundary of the current coding block is the left boundary of the slice and loop_filter_across_slices_enabled_flag is equal to 0.

– The left boundary of the current coding block is one of the vertical virtual boundaries of the picture and VirtualBoundariesDisabledFlag is equal to 1.

– Otherwise, if edgeType is equal to EDGE_HOR and one or more of the following conditions are true, the variable filterEdgeFlag is set equal to 0:

– The top boundary of the current luma coding block is the top boundary of the picture.

– The top boundary of the current coding block is the top boundary of the tile and loop_filter_across_tiles_enabled_flag is equal to 0.

– The top boundary of the current coding block is the top boundary of the slice and loop_filter_across_slices_enabled_flag is equal to 0.

– The top boundary of the current coding block is one of the horizontal virtual boundaries of the picture and VirtualBoundariesDisabledFlag is equal to 1.

– Otherwise, filterEdgeFlag is set equal to 1.

FIG. 36

Filtering process for a luma sample using short filters

- When nDp is greater than 0 and pred_mode_plt_flag of the coding unit that includes the coding block containing the sample $p_0$ is equal to 1, nDp is set equal to 0

- When nDq is greater than 0 and pred_mode_plt_flag of the coding unit that includes the coding block containing the sample $q_0$ is equal to 1, nDq is set equal to 0:

- When loop_filter_across_subpic_enabled_flag[ subPicIdxP ] is equal to 0, wherein subPicIdxP is the subpicture index containing the sample $p_i$. The filtered sample value, $p_i'$ is substituted by the corresponding input sample value $p_i$ with $i = 0..maxFilterLengthP - 1$.

- When loop_filter_across_subpic_enabled_flag[ subPicIdxQ ] is equal to 0, wherein subPicIdxQ is the subpicture index containing the sample $q_j$. The filtered sample value, $q_j'$ is substituted by the corresponding input sample value $q_j$ with $j = 0..maxFilterLengthQ - 1$.

FIG. 37

Filtering process for a luma sample using long filters

- When pred_mode_plt_flag of the coding unit that includes the coding block containing the sample $p_i$ is equal to 1, the filtered sample value, $p_i'$ is substituted by the corresponding input sample value $p_i$ with $i = 0..maxFilterLengthP - 1$.
- When pred_mode_plt_flag of the coding unit that includes the coding block containing the sample $q_j$ is equal to 1, the filtered sample value, $q_j'$ is substituted by the corresponding input sample value $q_j$ with $j = 0..maxFilterLengthQ - 1$.
- When loop_filter_across_subpic_enabled_flag[ subPicIdxP ] is equal to 0, wherein subPicIdxP is the subpicture index containing the sample $p_i$. The filtered sample value, $p_i'$ is substituted by the corresponding input sample value $p_i$ with $i = 0..maxFilterLengthP - 1$.
- When loop_filter_across_subpic_enabled_flag[ subPicIdxQ ] is equal to 0, wherein subPicIdxQ is the subpicture index containing the sample $q_j$. The filtered sample value, $q_j'$ is substituted by the corresponding input sample value $q_j$ with $j = 0..maxFilterLengthQ - 1$.

FIG. 38

Filtering process for a chroma sample

- When pred_mode_plt_flag of the coding unit that includes the coding block containing the sample $p_i$ is equal to 1, the filtered sample value, $p_i'$ is substituted by the corresponding input sample value $p_i$ with $i = 0..maxFilterLengthP - 1$.
- When pred_mode_plt_flag of the coding unit that includes the coding block containing the sample $q_j$ is equal to 1, the filtered sample value, $q_j'$ is substituted by the corresponding input sample value $q_j$ with $j = 0..maxFilterLengthQ - 1$:
- When loop_filter_across_subpic_enabled_flag[ subPicIdxP ] is equal to 0, wherein subPicIdxP is the subpicture index containing the sample $p_i$. The filtered sample value, $p_i'$ is substituted by the corresponding input sample value $p_i$ with $i = 0..maxFilterLengthP - 1$.
- When loop_filter_across_subpic_enabled_flag[ subPicIdxQ ] is equal to 0, wherein subPicIdxQ is the subpicture index containing the sample $q_j$. The filtered sample value, $q_j'$ is substituted by the corresponding input sample value $q_j$ with $j = 0..maxFilterLengthQ - 1$.

FIG. 39

Deblocking filter process

The deblocking filter process is applied to all coding subblock edges and transform block edges of a picture, except the following types of edges:

- Edges that are at the boundary of the picture,
- Edges that coincide with the Top boundaries of a subpicture for which loop_filter_across_subpic_enabled_flag[ SubPicIdxAbove ] is equal to 0, wherein subPicIdxAbove is the subpicture index containing the sample (xCtb, yCtb-1) and the sample (xCtb, yCtb-1) belongs to a different subpicture.
- Edges that coincide with the Left boundaries of a subpicture for which loop_filter_across_subpic_enabled_flag[ SubPicIdxLeft ] is equal to 0, wherein subPicIdxLeft is the subpicture index containing the sample (xCtb-1, yCtb) and the sample (xCtb-1, yCtb) belongs to a different subpicture.
- Edges that coincide with the Left boundaries of a subpicture or Edges that coincide with the Top boundaries of a subpicture for which loop_filter_across_subpic_enabled_flag[ SubPicIdx ] is equal to 0, wherein subPicIdx is the subpicture index containing the sample (xCtb, yCtb)
- Edges that coincide with the virtual boundaries of the picture when VirtualBoundariesDisabledFlag is equal to 1,
- Edges that coincide with tile boundaries when loop_filter_across_tiles_enabled_flag is equal to 0,
- Edges that coincide with slice boundaries when loop_filter_across_slices_enabled_flag is equal to 0,
- Edges that coincide with upper or left boundaries of slices with slice_deblocking_filter_disabled_flag equal to 1,
- Edges within slices with slice_deblocking_filter_disabled_flag equal to 1,
- Edges that do not correspond to 4x4 sample grid boundaries of the luma component,
- Edges that do not correspond to 8x8 sample grid boundaries of the chroma component,
- Edges within the luma component for which both sides of the edge have intra_bdpcm_luma_flag equal to 1,
- Edges within the chroma components for which both sides of the edge have intra_bdpcm_chroma_flag equal to 1,
- Edges of chroma subblocks that are not edges of the associated transform unit.

FIG. 41

Filtering process for a luma sample using short filters

- When nDp is greater than 0 and pred_mode_plt_flag of the coding unit that includes the coding block containing the sample $p_0$ is equal to 1, nDp is set equal to 0.
- When nDq is greater than 0 and pred_mode_plt_flag of the coding unit that includes the coding block containing the sample $q_0$ is equal to 1, nDq is set equal to 0.
- When nDp is greater than 0 and the sample $p_0$ and the sample $q_0$ are belong to a different subpicture and loop_filter_across_subpic_enabled_flag[ subPicIdxP ] is equal to 0, wherein subPicIdxP is the subpicture index containing the sample $p_0$, nDp is set equal to 0.
- When nDq is greater than 0 and the sample $q_0$ and the sample $p_0$ are belong to a different subpicture and loop_filter_across_subpic_enabled_flag[ subPicIdxQ ] is equal to 0, wherein subPicIdxQ is the subpicture index containing the sample $q_0$, nDq is set equal to 0.

FIG. 42

Filtering process for a luma sample using long filters

- When pred_mode_plt_flag of the coding unit that includes the coding block containing the sample $p_i$ is equal to 1, the filtered sample value, $p_i'$ is substituted by the corresponding input sample value $p_i$ with i = 0..maxFilterLengthP − 1.
- When pred_mode_plt_flag of the coding unit that includes the coding block containing the sample $q_i$ is equal to 1, the filtered sample value, $q_i'$ is substituted by the corresponding input sample value $q_j$ with j = 0..maxFilterLengthQ − 1.
- When the sample $p_i$ and the sample $q_0$ are belong to a different subpicture and loop_filter_across_subpic_enabled_flag[ subPicIdxP ] is equal to 0, wherein subPicIdxP is the subpicture index containing the sample $p_i$, the filtered sample value, $p_i'$ is substituted by the corresponding input sample value $p_i$ with i = 0..maxFilterLengthP − 1.
- When the sample $q_i$ and $p_0$ are belong to a different subpicture and loop_filter_across_subpic_enabled_flag[ subPicIdxQ ] is equal to 0, wherein subPicIdxQ is the subpicture index containing the sample $q_i$, the filtered sample value, $q_i'$ is substituted by the corresponding input sample value $q_i$ with i = 0..maxFilterLengthQ − 1.

FIG. 43

Filtering process for a chroma sample

- When pred_mode_plt_flag of the coding unit that includes the coding block containing the sample $p_i$ is equal to 1, the filtered sample value, $p_i'$ is substituted by the corresponding input sample value $p_i$ with i = 0..maxFilterLengthP − 1.
- When pred_mode_plt_flag of the coding unit that includes the coding block containing the sample $q_i$ is equal to 1, the filtered sample value, $q_i'$ is substituted by the corresponding input sample value $q_i$ with i = 0..maxFilterLengthQ − 1:
- When the sample $p_i$ and $q_0$ are belong to a different subpicture and loop_filter_across_subpic_enabled_flag[ subPicIdxP ] is equal to 0, wherein subPicIdxP is the subpicture index containing the sample $p_i$. the filtered sample value, $p_i'$ is substituted by the corresponding input sample value $p_i$ with i = 0..maxFilterLengthP − 1.
- When the sample $q_i$ and $p_0$ are belong to a different subpicture and loop_filter_across_subpic_enabled_flag[ subPicIdxQ ] is equal to 0, wherein subPicIdxQ is the subpicture index containing the sample $q_i$. the filtered sample value, $q_i'$ is substituted by the corresponding input sample value $q_i$ with i = 0..maxFilterLengthQ − 1.

FIG. 44

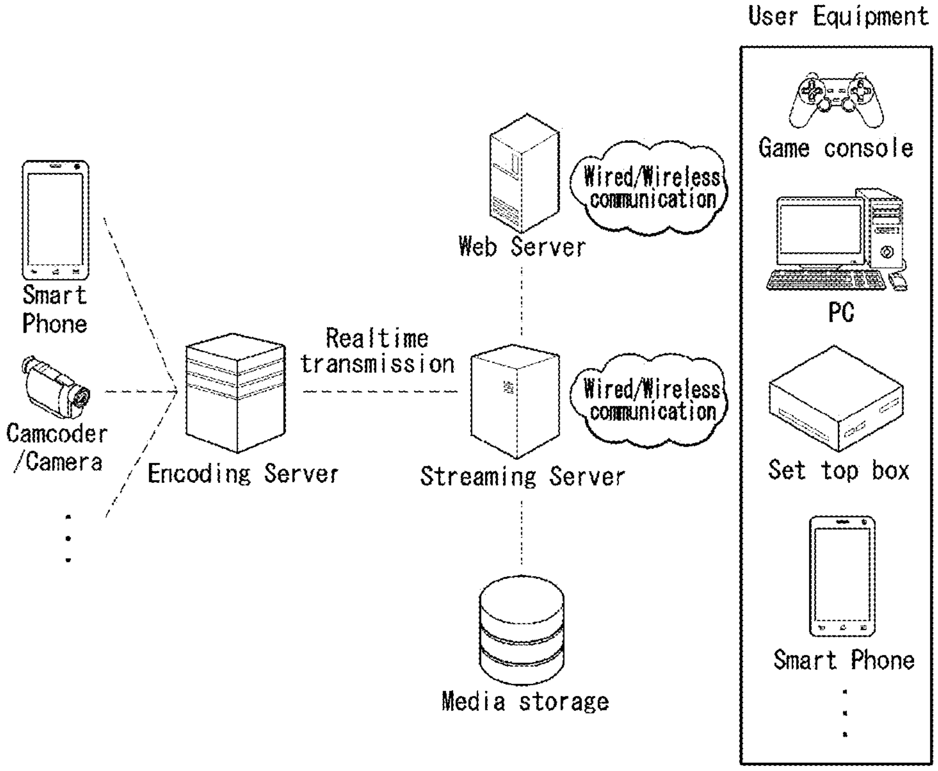

IMAGE ENCODING/DECODING METHOD AND APPARATUS FOR PERFORMING IN-LOOP FILTERING ON BASIS OF SUB-PICTURE STRUCTURE, AND METHOD FOR TRANSMITTING BITSTREAM

This application is a Continuation application of U.S. patent application Ser. No. 17/766,954, filed on Apr. 6, 2022, now allowed, which is a National Stage of International Application No. PCT/KR2020/013595, filed on Oct. 6, 2020, which claims the benefit of U.S. Provisional Application No. 62/911,956, filed on Oct. 7, 2019, U.S. Provisional Application No. 62/912,605, filed on Oct. 8, 2019, U.S. Provisional Application No. 62/960,124, filed on Jan. 12, 2020, and U.S. Provisional Application No. 62/960,685, filed on Jan. 13, 2020 the contents of which are all hereby incorporated by reference herein in their entirety.

TECHNICAL FIELD

The present disclosure relates to an image encoding/decoding method and apparatus for performing in-loop filtering based on a subpicture structure and a method of transmitting a bitstream, and, more particularly, to an image encoding/decoding method and apparatus for performing in-loop filtering across a boundary of a subpicture, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for performing in-loop filtering across a boundary of a current block.

Another object of the present disclosure is to provide an image encoding/decoding method and apparatus for performing in-loop filtering based on a subpicture structure.

Another object of the present disclosure is to provide an image encoding/decoding method and apparatus for performing in-loop filtering in consideration of an adjacent subpicture adjacent to a boundary of a current block.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise decoding a first flag specifying whether in-loop filtering is able to be performed across a boundary of a subpicture from a bitstream and performing the in-loop filtering on a boundary of a current block, based on the first flag. Based on the boundary of the current block being a boundary of a current subpicture including the current block, the in-loop filtering on the boundary of the current block may not be performed, based on the first flag for the current subpicture specifying that the in-loop filtering is not able to be performed across the boundary of the current subpicture or the first flag for an adjacent subpicture adjacent to the boundary of the current block specifying that the in-loop filtering is not able to be performed across the boundary of the adjacent subpicture.

An image decoding apparatus according to an aspect of the present disclosure may comprise a memory and at least one processor. The at least one processor may decode a first flag specifying whether in-loop filtering is able to be performed across a boundary of a subpicture from a bitstream and perform the in-loop filtering on a boundary of a current block, based on the first flag. Based on the boundary of the current block being a boundary of a current subpicture including the current block, the in-loop filtering on the boundary of the current block may not be performed, based on the first flag for the current subpicture specifying that the in-loop filtering is not able to be performed across the boundary of the current subpicture or the first flag for an adjacent subpicture adjacent to the boundary of the current block specifying that the in-loop filtering is not able to be performed across the boundary of the adjacent subpicture.

An image encoding method performed by an image encoding apparatus according to an aspect of the present disclosure may comprise determining whether in-loop filtering is able to be performed across a boundary of a subpicture and performing the in-loop filtering on a boundary of a current block based on a result of determination. Based on the boundary of the current block being a boundary of a current subpicture including the current block, the in-loop filtering on the boundary of the current block may not be performed, based on the first flag for the current subpicture specifying that the in-loop filtering is not able to be performed across the boundary of the current subpicture or the first flag for an adjacent subpicture adjacent to the boundary of the current block specifying that the in-loop filtering is not able to be performed across the boundary of the adjacent subpicture.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for performing improved in-loop filtering.

Also, according to the present disclosure, it is possible to provide an image encoding/decoding method and apparatus for performing in-loop filtering based on a subpicture structure.

Also, according to the present disclosure, it is possible to provide an image encoding/decoding method and apparatus for performing in-loop filtering in consideration of an adjacent subpicture adjacent to a boundary of a current block.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 14 is a view illustrating the configuration of an inter prediction unit 260 according to the present disclosure.

FIG. 15 is a view illustrating syntax for signaling a subpicture syntax element in SPS.

FIG. 16 is a view illustrating an example of an algorithm for deriving a predetermined variable such as SubPicTop.

FIG. 17 is a view illustrating a method of encoding an image using a subpicture by an image encoding apparatus according to an embodiment of the present disclosure.

FIG. 25 is a view illustrating SPS syntax for signaling a subpicture syntax element according to an embodiment of the present disclosure.

FIG. 26 is a view illustrating an example of a process of filtering luma samples based on the SPS syntax of FIG. 25.

FIG. 27 is a view illustrating another example of a process of filtering luma samples based on the SPS syntax of FIG. 25.

FIG. 28 is a view illustrating an example of a process of filtering chroma samples based on the SPS syntax of FIG. 25.

FIG. 30 is a view illustrating an across filtering process according to an embodiment of the present disclosure.

FIGS. 31 and 32 are views illustrating an across filtering process on luma samples according to an embodiment of the present disclosure.

FIG. 33 is a view illustrating an across filtering process on chroma samples according to an embodiment of the present disclosure.

FIG. 35 is a view illustrating an across filtering process according to an embodiment of the present disclosure.

FIGS. 36 and 37 are views illustrating an across filtering process on luma samples according to an embodiment of the present disclosure.

FIG. 38 is a view illustrating an across filtering process on chroma samples according to an embodiment of the present disclosure.

FIG. 39 is a view illustrating an across filtering process according to an embodiment of the present disclosure.

FIGS. 41 and 42 are views illustrating an across filtering process on luma samples according to an embodiment of the present disclosure.

FIG. 43 is a view illustrating an across filtering process on chroma samples according to an embodiment of the present disclosure.

FIG. 44 is a view showing a content streaming system, to which an embodiment of the present disclosure is applicable.

MODE FOR INVENTION

Figure 1:
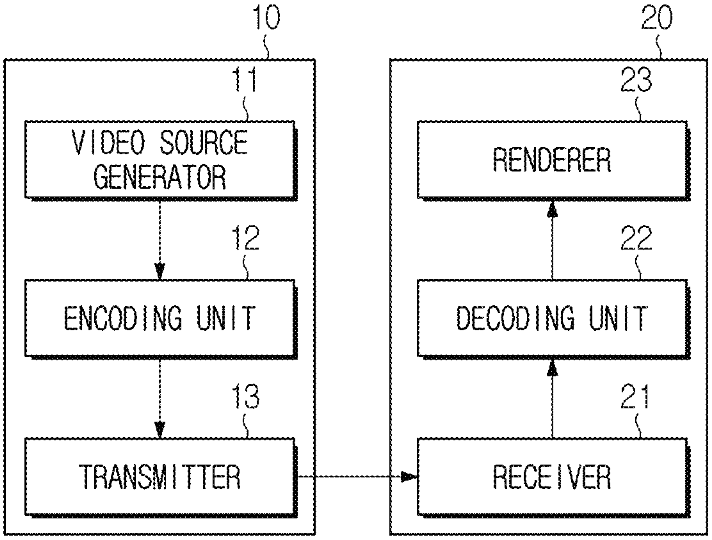
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The chroma component block of the current block may be expressed by including an explicit description of a luma component block, such as "luma block" or "current luma block". In addition, the chroma component block of the current block may be explicitly expressed by including an explicit description of the chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system, to which an embodiment of the present disclosure is applicable.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
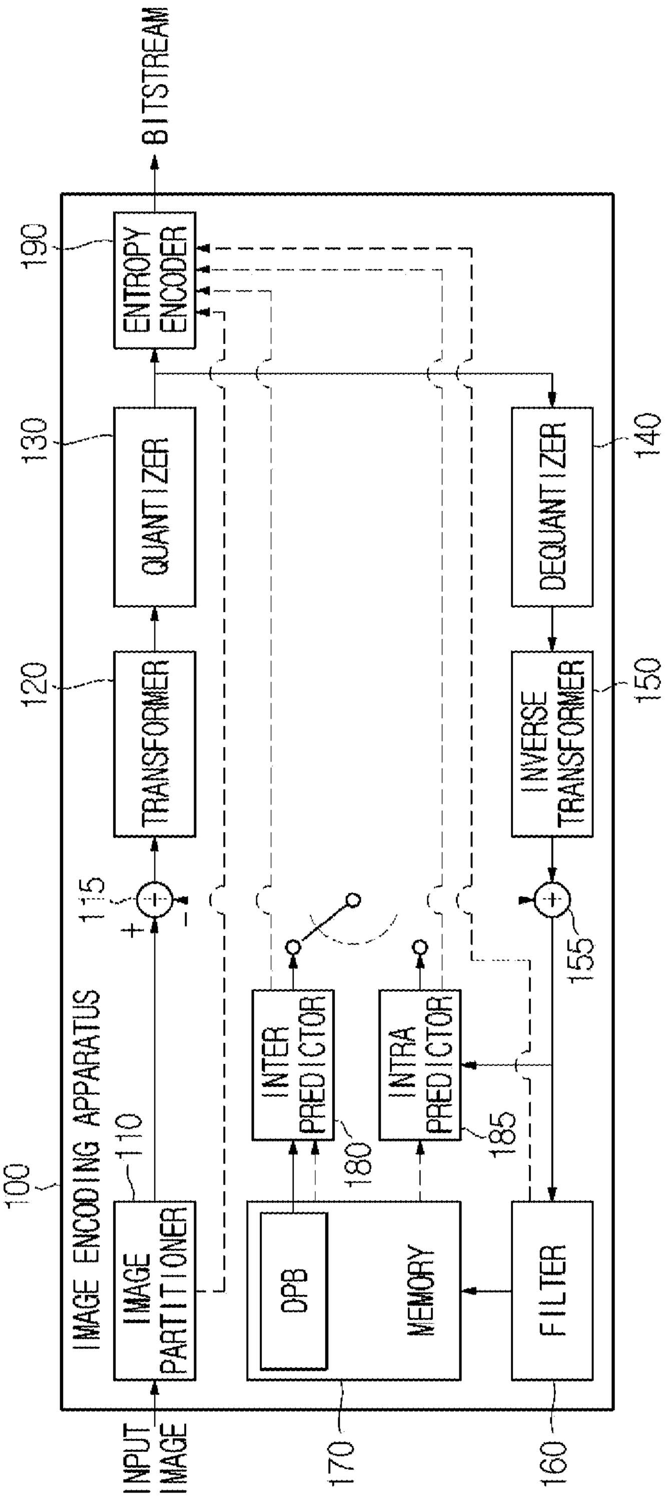
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block.

The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a colocated CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
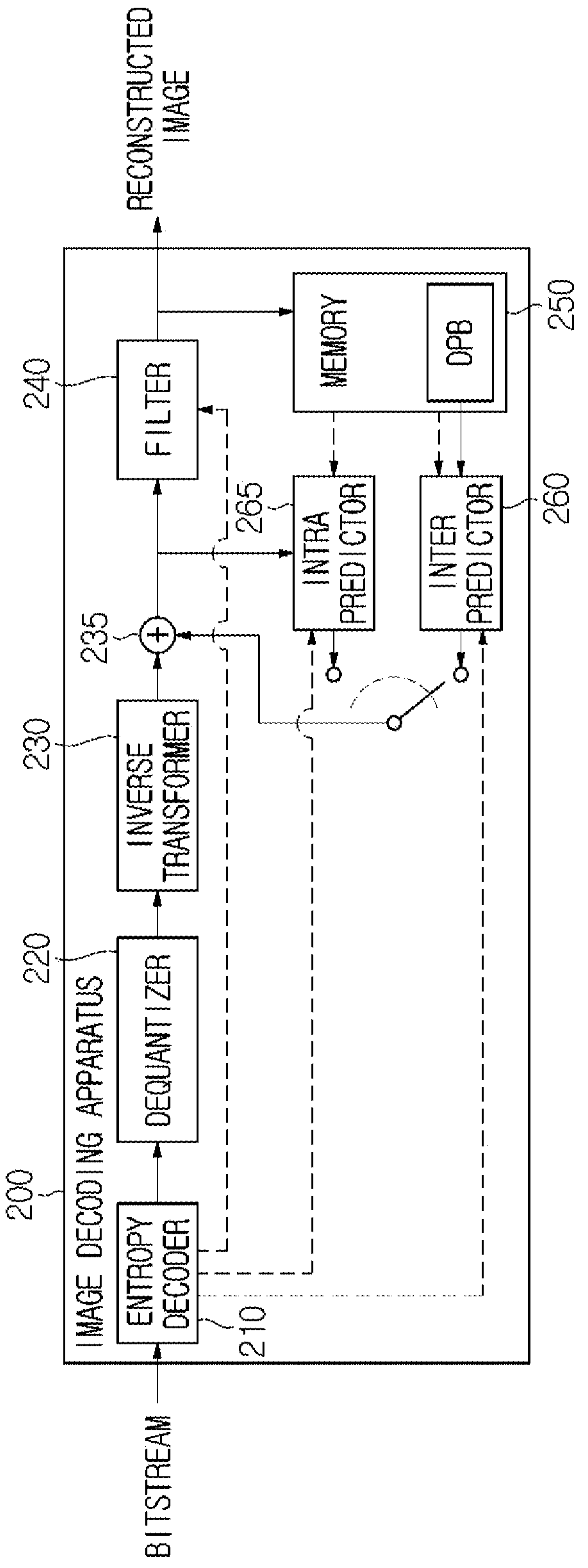
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de) quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding. A CU size and a TU size may be the same or a plurality of TUs may be present in a CU area. Meanwhile, the CU size may generally represent a luma component (sample) CB size. The TU size may generally represent a luma component (sample) TB size. A chroma component (sample) CB or TB size may be derived based on a luma component (sample) CB or TB size according to a component ratio according to a chroma format (color format, e.g., 4:4:4, 4:2:2, 4:2:0, etc.) of a picture/image. The TU size may be derived based on maxTbSize specifying an available maximum TB size. For example, when the CU size is greater than max TbSize, a plurality of TUs (TBs) of max TbSize may be derived from the CU and transform/inverse transform may be performed in units TUs (TBs). In addition, for example, when applying intra prediction, an intra prediction mode/type may be derived in units of CUs (or CBs), and a neighboring reference sample derivation and prediction sample generation procedure may be performed in units TUs (or TBs). In this case, one or a plurality of TUs (or TBs) may be present in one CU (or CB) area and, in this case, the plurality of TUs (or TBs) may share the same intra prediction mode/type.

In addition, in image encoding and decoding according to the present disclosure, an image processing unit may have a hierarchical structure. For example, one picture may be partitioned into one or more tiles or tile groups. One tile group may include one or more tiles. One tile may include one or more CTUs. The CTU may be partitioned into one or more CUs, as described above. The tile may consist of a rectangular region including CTUs assembled in a specific row and a specific column in a picture. The tile group may include an integer number of tiles according to tile-raster scan. A tile group header may signal information/parameters applicable to a corresponding tile group. When an encoding/decoding apparatus has a multi-core processor, an encoding/decoding procedure for the tile or tile group may be performed in parallel. Here, the tile group may have one of tile group types including an intra (I) tile group, a predictive (P) tile group and a bi-predictive (B) tile group. For blocks in the I tile group, inter prediction may not be used and only intra prediction may be used for prediction. Of course, even in this case, an original sample value may be coded and signalled without prediction. For blocks in the P tile group, intra prediction or inter prediction may be used, and only uni-prediction may be used when inter prediction. Meanwhile, for blocks in the B tile group, intra prediction or inter prediction may be used, and up to bi prediction may be used when inter prediction is used.

In an encoding apparatus, a tile/tile group, a slice, and a maximum and minimum coding unit size may be determined according to the characteristics (e.g., resolution) of an image and in consideration of coding efficiency or parallel processing and information thereon or information capable of deriving the same may be included in a bitstream.

In a decoding apparatus, information specifying a slice of a current picture, a tile/tile group or a CTU in a tile is partitioned into a plurality of coding units may be obtained. When such information is obtained (transmitted) only under specific conditions, efficiency may increase.

The slice header or the tile group header (tile group header syntax) may include information/parameters commonly applicable to the slice or tile group. APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to the entire video. In the present disclosure, higher level syntax may include at least one of the APS syntax, the PPS syntax, the SPS syntax or the VPS syntax.

In addition, for example, information on partitioning and construction of the tile/tile group may be constructed at an encoding stage through the higher level syntax and transmitted to a decoding apparatus in the form of a bitstream.

Partitioning Structure

Figure 4:
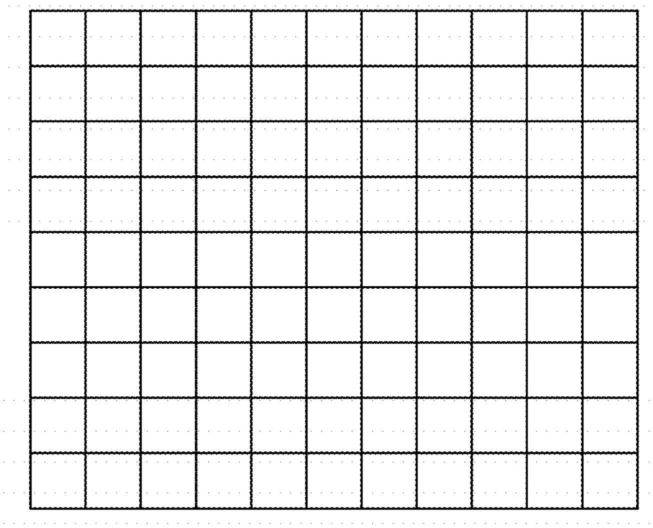
FIG. 4 is a view showing a partitioning structure of an image according to an embodiment.

Pictures may be partitioned into a sequence of coding tree units (CTUs). The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples. FIG. 4 shows an example in which a picture is partitioned into CTUs.

A maximum allowable size of a CTU for coding and prediction may be different from that of a CTU for transform. For example, even when a maximum size of a luma block in the CTU for transform is 64×64, a maximum size of a luma block for the CTU for coding and prediction may be 128×128.

In addition, a picture may be partitioned into one or more tile rows and one or more tile columns. A tile may be a sequence of CTUs covering a rectangular region in a picture.

A tile may be partitioned into one or more bricks, and each brick may consist of a plurality of CTU rows in a tile. In the present disclosure, a tile which is not partitioned into a plurality of bricks may be referred to as a brick.

A slice may include a plurality of tiles in a picture or a plurality of bricks in a tile. Two modes of a slice may be supported. One may be a raster scan slice mode and the other may be a rectangular slice mode.

In the raster slice mode, a slice may include a plurality of consecutive tiles within a picture according to a raster scan order. In the present disclosure, a slice according to the raster scan slice mode may be referred to as a raster scan slice.

In the rectangular slice mode, a slice may include a plurality of bricks constructing a rectangular region within a picture. In the present disclosure, a slice according to the rectangular slice mode may be referred to as a rectangular slice. A plurality of bricks included in the rectangular slice may exist according to the brick raster scan order of the slice.

Figure 5A:
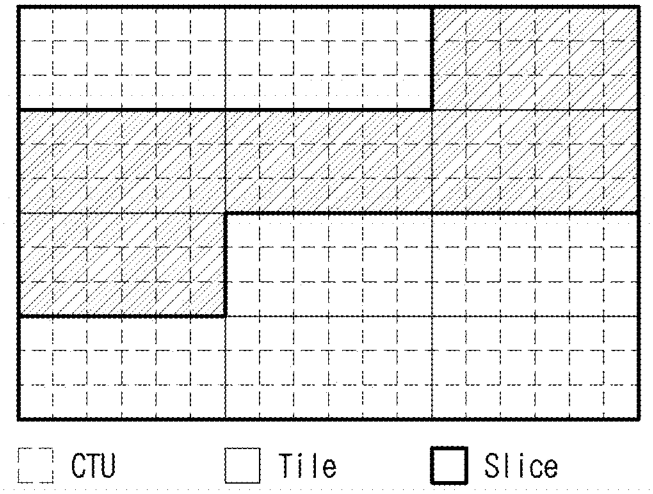
FIGS. 5*a* to 5*c* are views illustrating partitioning examples of a picture.
Figure 5B:
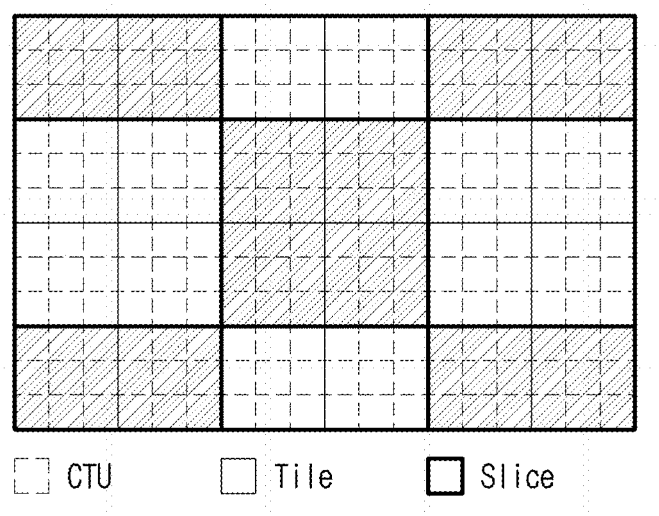
Figure 5C:
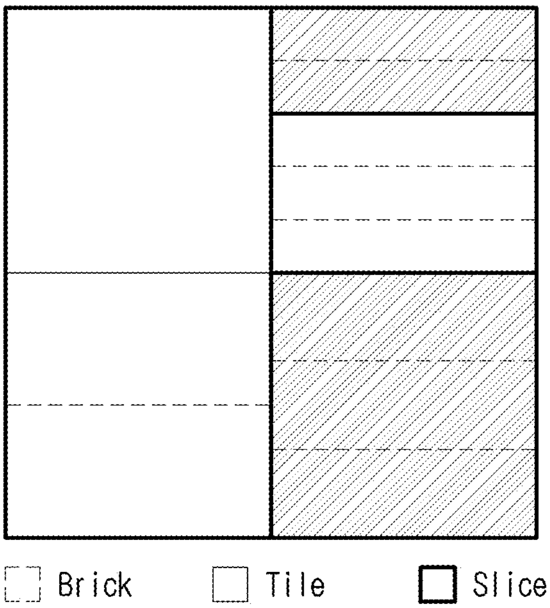

FIGS. 5*a* to 5*c* are views illustrating partitioning examples of a picture.

First, referring to FIG. 5*a*, in the raster scan slice mode, ap picture may be partitioned into 12 tiles and three raster scan slices.

Referring to FIG. 5*b*, in the rectangular slice mode, a picture may be partitioned into 24 tiles (that is, six tile rows and four tile columns) and nine rectangular slices.

Referring to FIG. 5*c*, a picture may be partitioned into four tiles (that is, two tile rows and two tile columns), 11 bricks (that is, one top-left brick, five top-right bricks, two bottom-left bricks and three bottom-right bricks) and four rectangular slices.

Overview of Partitioning of CTU

As described above, the coding unit (CU) may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

Figure 6:
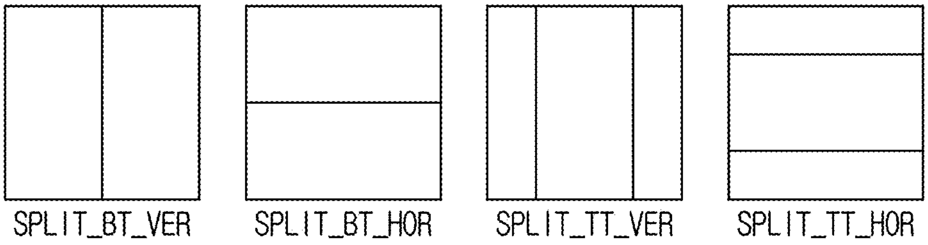
FIG. 6 is a view showing an embodiment of a partitioning type of a block according to a multi-type tree structure.

FIG. 6 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SP- LIT_BT_VER) and horizontal binary splitting (SPLIT_BT_HOR). Vertical binary splitting (SPLIT_BT_VER) means that the current CU is split into equally two in the vertical direction. As shown in FIG. 5, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 7:
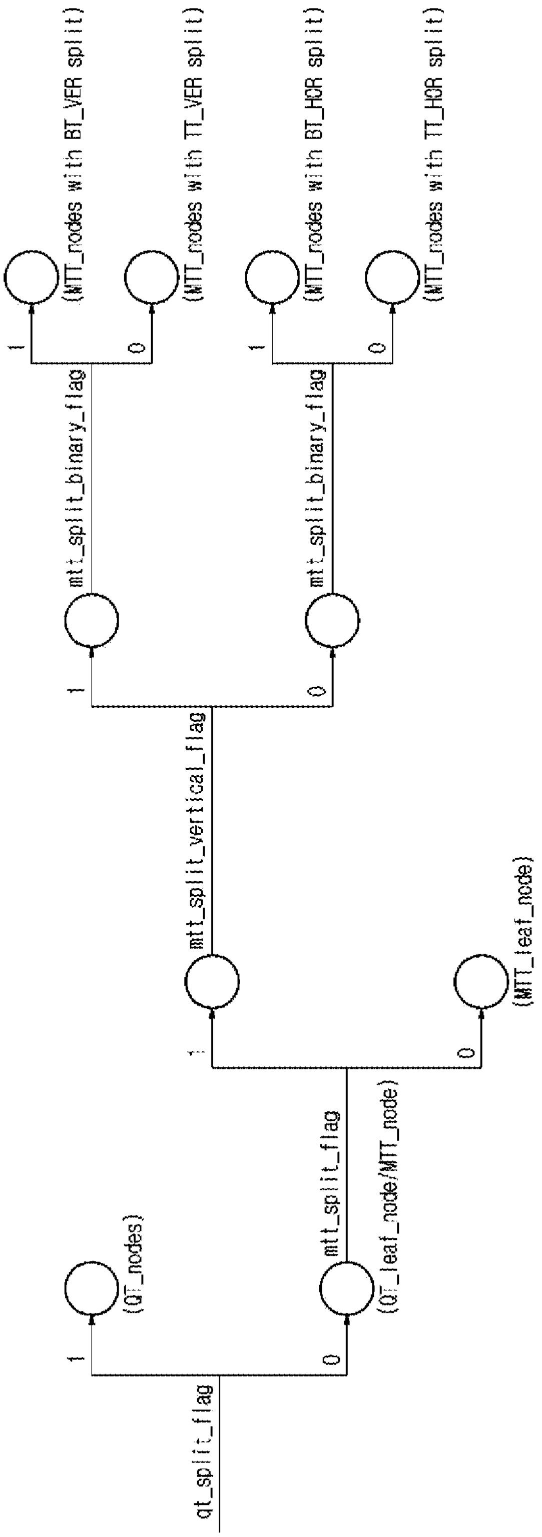
FIG. 7 is a view showing a signaling mechanism of block splitting information in a quadtree with nested multi-type tree structure according to the present disclosure.

FIG. 7 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., “1”), the current CU may be quadtree-partitioned. In addition, when qt_split_flag has a second value (e.g., “0”), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 8:
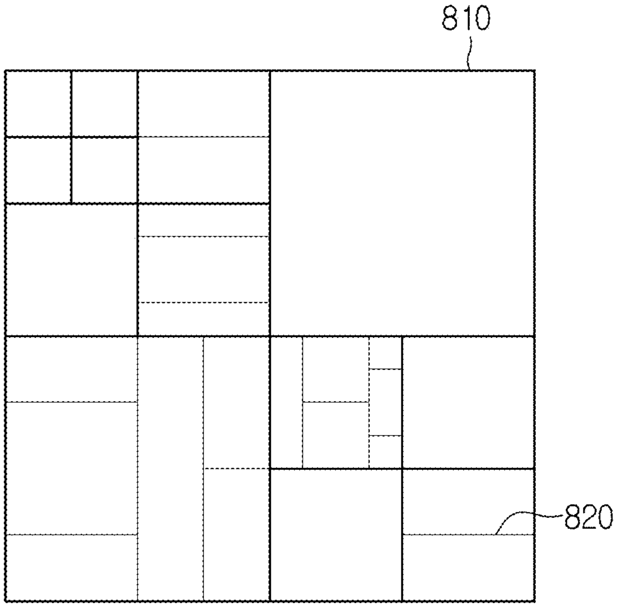
FIG. 8 is a view showing an example in which a CTU is partitioned into multiple CUs by applying a multi-type tree after applying a quadtree.

FIG. 8 is a view showing an example in which a CTU is partitioned into multiple CUS by applying a multi-type tree after applying a quadtree. In FIG. 8, bold block edges 810 represent quadtree partitioning and the remaining edges 820 represent multitype tree partitioning. The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having max TbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, Max TtSize may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtsize (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

When a portion of a tree node block exceeds a bottom picture boundary and/or a right picture boundary of a picture, the corresponding tree node block may be restricted such that samples in all coded CUs are located in the picture boundaries. In this case, for example, the following split rules may apply.

Split rule 1: As the case where a portion of the tree node block exceeds both the bottom picture boundary and the right picture boundary, when the tree node block is a QT node having a size greater than a minimum QT size, the tree node block may be split in a QT split mode and, when the tree node block has a size equal to or less than the minimum QT size or is not a QT node, the tree node block is split in a horizontal binary split mode SPLIT_BT_HOR mode.

Split rule 2: As the case where split rule 1 is not satisfied and a portion of the tree node block exceeds the bottom picture boundary, the tree node block is split in a QT split mode when the tree node block is a QT node having a size greater than a minimum QT size and a maximum BT size, and the tree node block is split in a horizontal binary split mode when the tree node block is a BTT node having a size equal to or less than the minimum QT size.

Split rule 3: As the case where split rule 1 and split rule 2 are not satisfied and a portion of the tree node block exceeds the right picture boundary, the tree node block is split in a QT split mode when the tree node block is a QT node having a size greater than a minimum QT size and a maximum BT size, and the tree node block is split in a QT split mode or horizontal binary split mode when the tree node block has a size greater than the minimum QT size and equal to or less than the maximum BT size. Alternatively, when the tree node block is a BTT node or has a size equal to or less than the minimum QT size, the tree node block is split in a horizontal binary split mode.

As described above, the quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Figure 9:
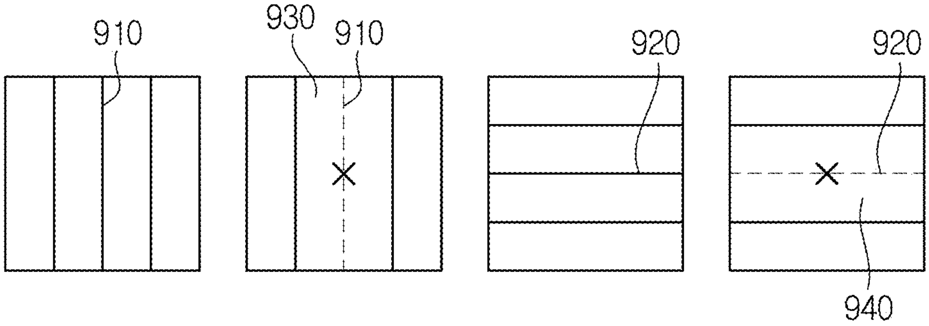
FIG. 9 shows redundant splitting patterns which may occur in binary tree splitting and ternary tree splitting.

For example, FIG. 9 shows redundant splitting patterns which may occur in binary tree splitting and ternary tree splitting. As shown in FIG. 9, continuous binary splitting 910 and 920 for one direction of two-step levels have the same coding block structure as binary splitting for a center partition after ternary splitting. In this case, binary tree splitting for center blocks 930 and 940 of ternary tree splitting may be prohibited, this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 9, when binary tree splitting for the center block of the CU is prohibited, a syntax element mtt_split_cu_binary_flag specifying whether splitting is binary splitting or ternary splitting is not signaled and the value thereof may be derived as 0 by a decoding apparatus.

Virtual Pipeline Data Unit

Virtual pipeline data units (VPDUs) may be defined for pipeline processing within a picture. The VPDUs may be defined as non-overlapping units within one picture. In a decoding apparatus, successive VPDUs may be simultaneously processed by multiple pipeline stages. In most pipeline stages, a VPDU size may be roughly proportional to a buffer size. Accordingly, keeping the VPDU size small is important when considering the buffer size from a point of view of hardware. In most decoding apparatuses, the VPDU size may be set equal to a maximum transform block (TB) size. For example, the VPDU size may be 64×64 (64×64 luma samples) size. In addition, the VPDU size may be changed (increased or decreased) in consideration of the above-described ternary tree (TT) and/or binary tree (BT) split.

Meanwhile, to keep the VPDU size at 64×64, at least one of the following restrictions may be applied.

Restriction 1: Ternary tree splitting for a CU having at least one of a width or height of 128 is not allowed.

Restriction 2: Horizontal binary tree splitting for a CU having a width of 128 and a height of 64 or less (i.e. 128×N CU with N≤64) is not allowed.

Restriction 3: Vertical binary tree splitting for a CU having a width of 64 or less or a height of 128 (i.e. N×128 CU with N≤64) is not allowed.

Figure 10:
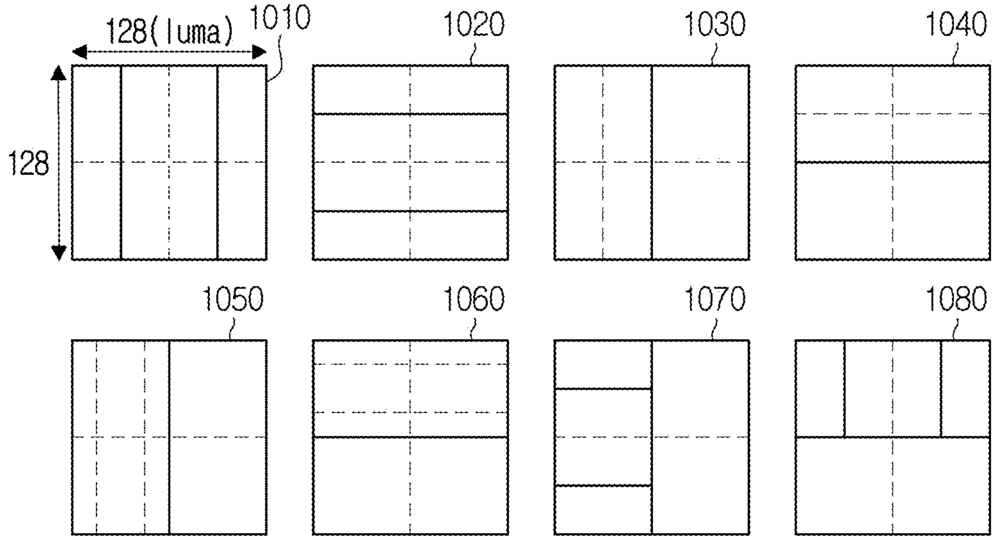
FIG. 10 is a view illustrating examples in which CU splitting is restricted.

Splitting examples of a CU now allowed under the above restrictions are shown in FIG. 10. In FIG. 10, bold solid lines denote block split and the remaining solid lines denote CUs.

Referring to FIG. 10, according to Restriction 1, vertical ternary tree splitting for a 128×128 CU 1010 is not allowed. In addition, according to Restriction 1, horizontal ternary tree splitting for a 128×128 CU 1020 is not allowed. In addition, according to Restriction 3, vertical binary tree splitting for a 64×128 CU 1030 is not allowed. In addition, according to Restriction 2, horizontal binary tree splitting for a 128×64 CU 1040 is not allowed. In addition, according to Restriction 1, vertical ternary tree splitting for a 64×128 CU 1050 is not allowed. In addition, according to Restriction 1, horizontal ternary tree splitting for a 128×64 CU 1060 is not allowed. In addition, according to Restriction 1, horizontal ternary splitting for a 64×128 CU 1070 is not allowed. In addition, according to Restriction 1, vertical ternary splitting for a 128×64 CU 1080 is not allowed.

Meanwhile, in a dual tree within an intra picture, different partitioning structures may apply to a luma coding tree and a chroma coding tree. In the dual tree, a longer coding pipeline may be introduced, and in the chroma coding tree, a chroma block having a small size such as 2×2, 4×2 and 2×4 may be allowed according to a range of a QTBT MinQTSizeC value, MinBtSizeY, and MinTTSizeY. However, this may make it difficult to design a practical decoding apparatus. In addition, a multiplication operation is required in a cross-component linear model (CCLM) mode, a planar mode, an angular mode, etc. In order to solve the above-described issues, in the dual tree, a chroma block having a small size such as 2×2, 4×2 and 2×4 may be restricted through partitioning restrictions.

Overview of Inter Prediction

Hereinafter, inter prediction according to the present disclosure will be described.

The prediction unit of an image encoding apparatus/image decoding apparatus according to the present disclosure may perform inter prediction in units of blocks to derive a prediction sample. Inter prediction may represent prediction derived in a manner that is dependent on data elements (e.g., sample values, motion information, etc.) of picture(s) other than a current picture. When inter prediction applies to the current block, a predicted block (prediction block or a prediction sample array) for the current block may be derived based on a reference block (reference sample array) specified by a motion vector on a reference picture indicated by a reference picture index. In this case, in order to reduce the amount of motion information transmitted in an inter prediction mode, motion information of the current block may be predicted in units of blocks, subblocks or samples, based on correlation of motion information between a neighboring block and the current block. The motion information may include a motion vector and a reference picture index. The motion information may further include inter prediction type (L0 prediction, L1 prediction, Bi prediction, etc.) information. When applying inter prediction, the neighboring block may include a spatial neighboring block present in the current picture and a temporal neighboring block present in the reference picture. A reference picture including the reference block and a reference picture including the temporal neighboring block may be the same or different. The temporal neighboring block may be referred to as a collocated reference block, collocated CU (ColCU) or colBlock, and the reference picture including the temporal neighboring block may be referred to as a collocated picture (colPic) or colPicture. For example, a motion information candidate list may be constructed based on the neighboring blocks of the current block, and flag or index information specifying which candidate is selected (used) may be signaled in order to derive the motion vector of the current block and/or the reference picture index.

Inter prediction may be performed based on various prediction modes. For example, in the case of a skip mode and a merge mode, the motion information of the current block may be equal to the motion information of the selected neighboring block. In the case of the skip mode, a residual signal may not be transmitted unlike the merge mode. In the case of a motion information prediction (MVP) mode, the motion vector of the selected neighboring block may be used as a motion vector predictor and a motion vector difference may be signaled. In this case, the motion vector of the current block may be derived using a sum of the motion vector predictor and the motion vector difference. In the present disclosure, the MVP mode may have the same meaning as advanced motion vector prediction (AMVP).

The motion information may include L0 motion information and/or L1 motion information according to the inter prediction type (L0 prediction, L1 prediction, Bi prediction, etc.). The motion vector in an L0 direction may be referred to as an L0 motion vector or MVL0, and the motion vector in an L1 direction may be referred to as an L1 motion vector or MVL1. Prediction based on the L0 motion vector may be referred to as L0 prediction, prediction based on the L1 motion vector may be referred to as L1 prediction, and prediction based both the L0 motion vector and the L1 motion vector may be referred to as Bi prediction. Here, the L0 motion vector may specify a motion vector associated with a reference picture list L0 (L0) and the L1 motion vector may specify a motion vector associated with a reference picture list L1 (L1). The reference picture list L0 may include pictures before the current picture in output order as reference pictures, and the reference picture list L1 may include pictures after the current picture in output order. The previous pictures may be referred to as forward (reference) pictures and the subsequent pictures may be referred to as reverse (reference) pictures. The reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 11:
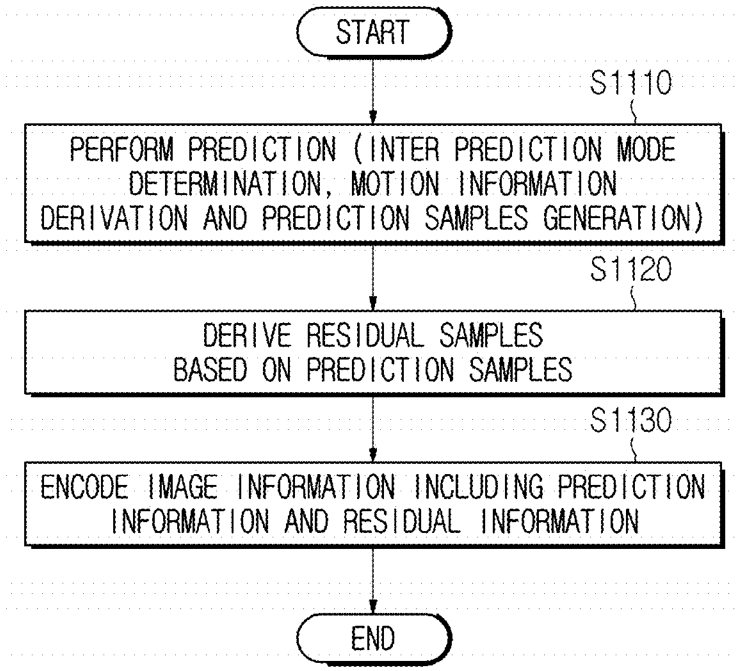
FIG. 11 is a flowchart illustrating an inter prediction based video/image encoding method.

FIG. 11 is a flowchart illustrating an inter prediction based video/image encoding method.

Figure 12:
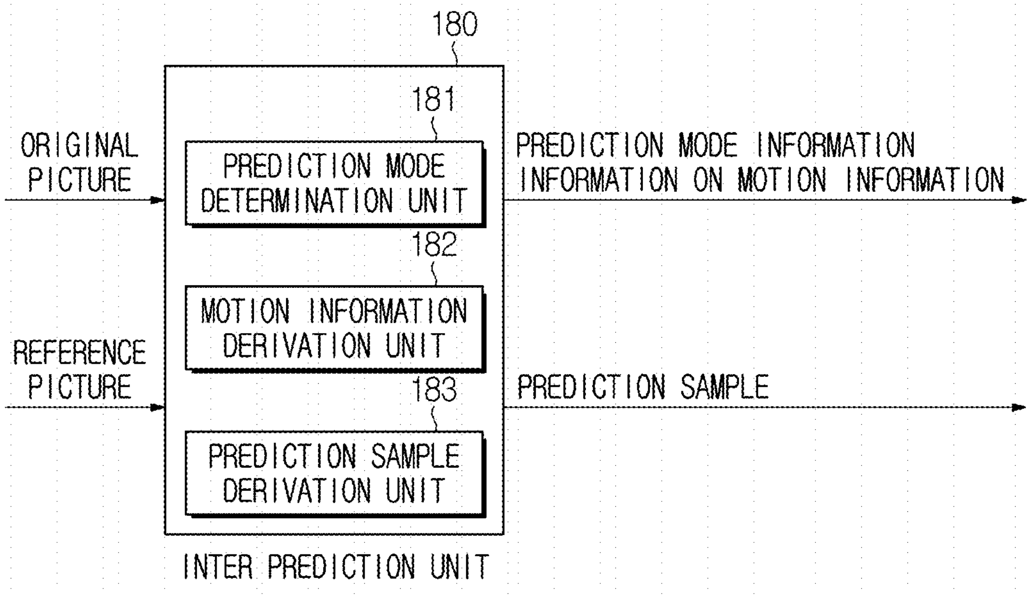
FIG. 12 is a view illustrating the configuration of an inter prediction unit 180 according to the present disclosure.

FIG. 12 is a view illustrating the configuration of an inter prediction unit 180 according to the present disclosure.

The encoding method of FIG. 11 may be performed by the image encoding apparatus of FIG. 2. Specifically, step S1110 may be performed by the inter prediction unit 180, and step S1120 may be performed by the residual processor. Specifically, step S1120 may be performed by the subtractor 115. Step S630 may be performed by the entropy encoder 190. The prediction information of step S1130 may be derived by the inter prediction unit 180, and the residual information of step S1130 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficients may be derived as quantized transform coefficients through the quantizer 130. Information on the quantized transform coefficients may be encoded by the entropy encoder 190 through a residual coding procedure.

Referring to FIGS. 11 and 12 together, the image encoding apparatus may perform inter prediction on a current block (S1110). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 12, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose a difference from the current block is equal to or less than a predetermined criterion or a minimum. Based on this, a reference picture index specifying a reference picture in which the reference block is located may be derived, and a motion vector may be derived based on a position difference between the reference block and the current block. The image encoding apparatus may determine a mode applying to the current block among various prediction modes. The image encoding apparatus may compare rate-distortion (RD) costs for the various prediction modes and determine an optimal prediction mode of the current block. However, the method of determining the prediction mode of the current block by the image encoding apparatus is not limited to the above example, and various methods may be used.

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose a difference from the current block is equal to or less than a predetermined criterion or a minimum, among reference blocks specified by merge candidates included in the merge candidate list. In this case, a merge candidate associated with the derived reference block may be selected, and merge index information specifying the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (mvp) candidates from the neighboring blocks of the current block and construct an mvp candidate list using the derived mvp candidates. In addition, the image encoding apparatus may use the motion vector of the mvp candidate selected from among the mvp candidates included in the mvp candidate list as the mvp of the current block. In this case, for example, the motion vector indicating the reference block derived by the above-described motion estimation may be used as the motion vector of the current block, an mvp candidate with a motion vector having a smallest difference from the motion vector of the current block among the mvp candidates may be the selected mvp candidate. A motion vector difference (MVD) which is a difference obtained by subtracting the mvp from the motion vector of the current block may be derived. In this case, index information specifying the selected mvp candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S1120). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S1130). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag specifies whether a skip mode applies to the current block, and the merge flag specifics whether the merge mode applies to the current block. Alternatively, the prediction mode information may specify one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the mvp flag or the mvp index may be signaled when the MVP mode applies to the current block and may be information for selecting one of mvp candidates in an mvp candidate list. In addition, the information on the motion information may include information on the above-described MVD and/or reference picture index information. In addition, the information on the motion information may include information specifying whether to apply L0 prediction, L1 prediction or Bi prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

Figure 13:
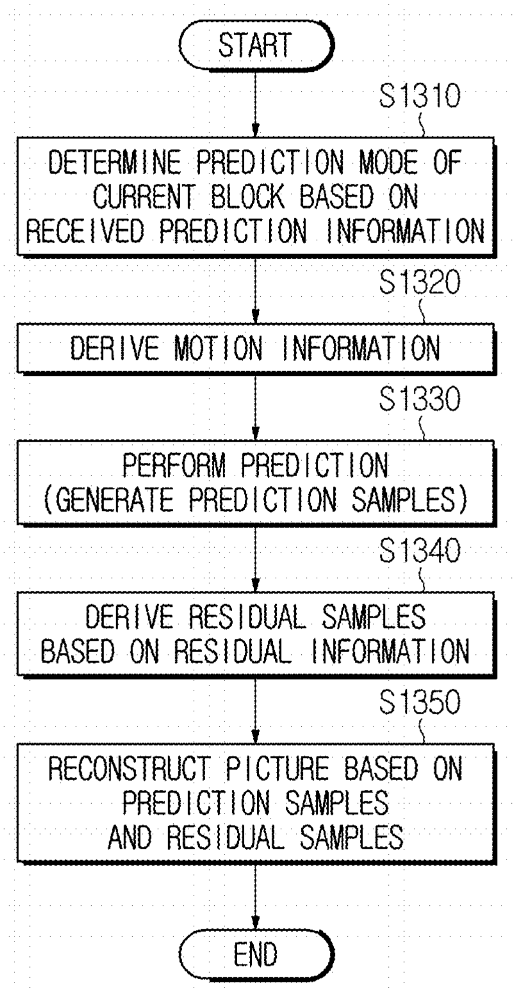
FIG. 13 is a flowchart illustrating an inter prediction based video/image decoding method.

FIG. 13 is a flowchart illustrating an inter prediction based video/image decoding method.

FIG. 14 is a view illustrating the configuration of an inter prediction unit 260 according to the present disclosure.

The image decoding apparatus may perform operation corresponding to operation performed by the image encoding apparatus. The image decoding apparatus may perform prediction on a current block based on received prediction information and derive prediction samples.

The decoding method of FIG. 13 may be performed by the image decoding apparatus of FIG. 3. Steps S1310 to S1330 may be performed by the inter prediction unit 260, and the prediction information of step S1310 and the residual information of step S1340 may be obtained from a bitstream by the entropy decoder 210. The residual processor of the image decoding apparatus may derive residual samples for a current block based on the residual information (S1340). Specifically, the dequantizer 220 of the residual processor may perform dequantization based on dequantized transform coefficients derived based on the residual information to derive transform coefficients, and the inverse transformer 230 of the residual processor may perform inverse transform on the transform coefficients to derive the residual samples for the current block. Step S1350 may be performed by the adder 235 or the reconstructor.

Specifically, the image decoding apparatus may determine the prediction mode of the current block based on the received prediction information (S1310). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S1320). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an mvp candidate list and use the motion vector of an mvp candidate selected from among mvp candidates included in the mvp candidate list as an mvp of the current block. The selection may be performed based on the above-described candidate selection information (mvp flag or mvp index). In this case, the MVD of the current block may be derived based on information on the MVD, and the motion vector of the current block may be derived based on mvp and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S1330). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed on all or some of the prediction samples of the current block.

For example, as shown in FIG. 14, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S1340). The image decoding apparatus may generate the reconstructed samples of the current block based on the prediction samples and the residual samples and generate a reconstructed picture based on this (S1350). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Definition of Subpicture

Hereinafter, a subpicture according to the present disclosure will be described.

A subpicture may construct a rectangular area of a coded picture. The size of the subpicture may be differently set within the picture. For all pictures belonging to one sequence, the size and position of a specific individual subpicture may be equally set. The individual subpicture sequence may be independently decoded. A tile and a slice (and CTBs) may be limited not to span across a subpicture boundary. To this end, the encoding apparatus may perform encoding such that subpictures are independently decoded. To this end, semantic constraints in a bitstream may be required. In addition, for all pictures belonging to one sequence, arrangement of tiles, slices and bricks in a subpicture may be differently constructed.

Subpicture Design Purpose

The subpicture design aims at abstraction or encapsulation of a range less than a picture level or greater than a slice or tile group level. Therefore, a VCL NAL unit of a motion constant tile set (MCTS) subset may be extracted from one VVC bitstream and is relocated to another VVC bitstream without difficulty such as modification at a VCL-level. Here, the MCTS is an encoding technology of enabling spatial and temporal independence between tiles, and, when the MCTS applies, information on tiles which are not included in the MCTS to which a current tile belongs cannot be referred to. When an image is split into MCTSs and encoded, independent transmission and decoding of the MCTS are possible.

Such a subpicture design may have an advantage in changing the viewing orientation in a mixed resolution viewport dependent 360° streaming schemes.

Subpicture Use Case

Use of a subpicture is required in the viewport dependent 360° streaming scheme providing extended real spatial resolution on the viewport. For example, a scheme in tiles covering the viewport, derived from 6K (6144×3072) ERP (equi rectangular projection) picture or cube map projection (CMP) resolution having 4K decoding performance (HEVC level 5.1) equivalent thereto was included in Sections D.6.3 and D.6.4 of OMAF and was employed in the VR Industry Forum Guideline. Such resolution is known to be suitable for a head mount display using a quad-HD (2560×1440) display panel.

Encoding: Content may be encoded with two spatial resolutions including resolution having a 1656×1536 cube face size and resolution having a 768×768 cube face size. In this case, in all bitstreams, a 6×4 tile grid may be used and an MCTS may be coded at each tile position.

Streamed MCTS selection: 12 MCTSs may be selected from a high-resolution bitstream, and 12 additional MCTSs may be obtained from a low-resolution bitstream. Therefore, a hemi-sphere (180°×180°) of streamed content may be generated from the high-resolution bitstream.

Decoding using merging of MCTS and bitstream: MCTSs of a single time instance are received, which may be merged into a coded picture having a resolution of 1920×4608 conforming to HEVC level 5.1. In another option for the merged picture, four tile columns have a width value of 768, two tile columns have a width value of 384 and three tile rows have a height value of 768, thereby constructing a picture consisting of 3840×2304 luma samples. Here, the width and height units may be units of the number of luma samples.

Subpicture Signaling

Signaling of a subpicture may be performed at an SPS level as shown in FIG. 15.

FIG. 15 is a view illustrating SPS syntax for signaling a subpicture syntax element.

Referring to FIG. 15, a syntax element pic_width_max_in_luma_samples may specify a maximum width of each decoded picture referring to an SPS in units of luma samples. The value of pic_width_max_in_luma_samples may be greater than 0, and may have a value of an integer multiple of MinCbSize Y. Here, MinCbSizeY may specify a minimum size of a luma component coding block.

A syntax element pic_height_max_in_luma_samples may specify a maximum height of each decoded picture referring to an SPS in units of luma samples. pic_height_max_in_luma_samples may be greater than 0 and may have a value of an integer multiple of MinCbSize Y.

A syntax element subpic_grid_col_width_minus1 may be used to specify the width of an individual element of a subpicture identifier grid. For example, a value obtained by adding 1 to subpic_grid_col_width_minus1 may specify the width of the individual element of the subpicture identifier grid in units of 4 samples. subpic_grid_col_width_minus1 may have a Ceil (Log 2(pic_width_max_in_luma_samples/4)) bit length.

Therefore, a variable NumSubPicGridCols specifying the number of columns in the subpicture grid may be derived as shown in Equation 1 below.

$$NumSubPicGridCols = (\text{pic\_width\_max\_in\_luma\_samples} + \text{subpic\_grid\_col\_width\_minus1} * 4 + 3) / (\text{subpic\_grid\_col\_width\_minus1} * 4 + 4) \quad \text{[Equation 1]}$$

Next, a syntax element subpic_grid_row_height_minus1 may be used to specify the height of each element of a subpicture identifier grid. For example, a value obtained by adding 1 to subpic_grid_row_height_minus1 may specify the height of an individual element of the subpicture identifier grid in units of 4 samples. subpic_grid_row_height_minus1 may have a Ceil(Log 2 (pic_height_max_in_luma_samples/4)) bit length.

Therefore, a variable NumSubPicGridRows specifying the number of rows in the subpicture gird may be derived as shown in Equation 2 below.

$$NumSubPicGridRows = (\text{pic\_height\_max\_in\_luma\_samples} + \text{subpic\_grid\_row\_height\_minus1} * 4 + 3) / (\text{subpic\_grid\_row\_height\_minus1} * 4 + 4) \quad \text{[Equation 2]}$$

Next, a syntax element subpic_grid_idx[i] [j] may specify a subpicture index at a grid position (i, j). subpic_grid_idx[i] [j] may have a Ceil (Log 2 (max_subpics_minus1+1)) bit length.

Variables SubPicTop [subpic_grid_idx[i] [j]], SubPicLeft [subpic_grid_idx[i] [j]], SubPicWidth[subpic_grid_idx[i] [j]], SubPicHeight[subpic_grid_idx[i] [j]], and NumSubPic may be derived using the algorithm of FIG. 16.

Next, a syntax element subpic_treated_as_pic_flag[i] may specify whether a subpicture is treated as being the same as a general picture in a decoding process. For example, a first value (e.g., 0) of subpic_treated_as_pic_flag[i] may specify that an i-th subpicture included in an individual coding picture of a CVS is not treated as a picture in the decoding process. A second value (e.g., 1) of subpic_treated_as_pic_flag[i] may specify that an i-th subpicture included in an individual coding picture of a CVS is treated as a picture in the decoding process. When the value of subpic_treated_as_pic_flag[i] is not obtained from a bitstream, the value of subpic_treated_as_pic_flag[i] may be inferred as a first value (e.g., 0).

A syntax element loop_filter_across_subpic_enabled_flag[i] may specify whether in-loop filtering is able to be performed across a boundary of an i-th subpicture included in an individual coding picture of a CVS. For example, a first value (e.g., 0) of loop_filter_across_subpic_enabled_flag[i] may specify that in-loop filtering is not able to be performed across a boundary of an i-th subpicture included in an individual coding picture of a CVS. A second value (e.g., 1) of loop_filter_across_subpic_enabled_flag[i] may specify that in-loop filtering is able to be performed across a boundary of an i-th subpicture included in an individual coding picture of a CVS. When the value of loop_filter_across_subpic_enabled_flag[i] is not obtained from a bitstream, the value of loop_filter_across_subpic_enabled_flag[i] may be inferred as a first value (e.g., 0).

Meanwhile, for bitstream conformance, the following constraints may apply. For any two subpictures subpicA and subpicB, when the index of subpicA is less than that of subpicB, all coded NAL units of subpicA shall have a lower decoding order than all coded NAL units of subpicB. Alternatively, after decoding is performed, the shape of subpictures shall have a perfect left boundary and a perfect top boundary constructing a picture boundary or a boundary of a previously decoded subpicture.

Hereinafter, a method of encoding/decoding an image based on a subpicture structure will be described in detail with reference to FIGS. 17 and 18.

FIG. 17 is a view illustrating a method of encoding an image using a subpicture by an image encoding apparatus according to an embodiment of the present disclosure.

The image encoding apparatus may encode a current picture based on a subpicture structure. Alternatively, the image encoding apparatus may encode at least one subpicture constructing the current picture and output a (sub) bitstream including (encoded) information on at least one (encoded) subpicture.

Referring to FIG. 17, the image encoding apparatus may split an input picture into a plurality of subpictures (S1710). In addition, the image encoding apparatus may generate information on the subpicture (S1720). Here, the information on the subpicture may include information on an area of the subpicture and/or information on a grid spacing to be used for the subpicture. In addition, the information on the subpicture may include information specifying whether each subpicture is able to be treated as a picture and/or information specifying whether in-loop filter is able to be performed across a boundary of each subpicture.

The image encoding apparatus may encode at least one subpicture based on the information on the subpicture. For example, each subpicture may be independently encoded based on the information on the subpicture. In addition, the image encoding apparatus may encode image information including information on the subpicture and output a bitstream (S1730). Here, the bitstream for the subpicture may be referred to as a substream or a subbitstream.

Figure 18:
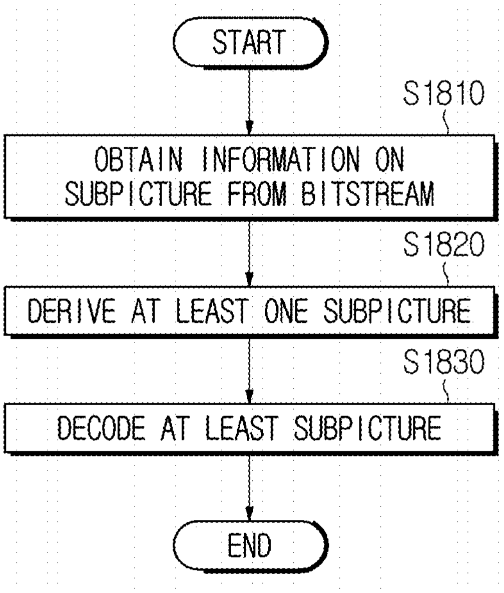
FIG. 18 is a view illustrating a method of decoding an image using a subpicture by an image decoding apparatus according to an embodiment.

FIG. 18 is a view illustrating a method of decoding an image using a subpicture by an image decoding apparatus according to an embodiment.

The image decoding apparatus may decode at least one subpicture belonging to a current picture using (encoded) information of at least one (encoded) subpicture obtained from a (sub) bitstream.

Referring to FIG. 18, the image decoding apparatus may obtain information on a subpicture from a bitstream (S1810). Here, the bitstream may include a substream or subbitstream for the subpicture. The information on the subpicture may be constructed in an HLS of the bitstream. In addition, the image decoding apparatus may derive at least one subpicture based on the information on the subpicture (S1820).

The image decoding apparatus may decode at least one subpicture based on the information on the subpicture (S1830). For example, when a current subpicture including the current block is treated as a picture, the current subpicture may be independently decoded. In addition, when in-loop filtering is able to be performed across the boundary of the current subpicture, in-loop filtering (e.g., deblocking filtering) may be performed on a boundary of the current subpicture and the boundary of an adjacent subpicture adjacent to the boundary. In addition, when the boundary of the current subpicture coincides with the picture boundary, in-loop filtering across the boundary of the current subpicture may not be performed. The image decoding apparatus may decode the subpicture based on a CABAC method, a prediction method, a residual processing method (transform and quantization), an in-loop filtering method, etc. In addition, the image decoding apparatus may output at least one decoded subpicture or a current picture including at least one subpicture. The decoded subpicture may be output in the form of an output sub-picture set (OPS). For example, in relation to a 360-degree image or omnidirectional image, when only a portion of the current picture is rendered, only some of all subpictures in the current picture may be decoded and all or some of the decoded subpictures may be rendered according to the viewport of the user.

Overview of Filtering

Hereinafter, a filtering method according to the present disclosure will be described.

Filtering may be performed on a reconstructed picture generated by an image encoding/decoding apparatus. As a result of performing filtering, a modified reconstructed picture may be generated, and the image decoding apparatus may determine the modified reconstructed picture as a final decoded picture. In addition, in the image encoding/decoding apparatus, the modified reconstructed picture may be stored in a decoding picture buffer (DPB) or a memory and then may be used as a reference picture when encoding/decoding a picture.

In the present disclosure, filtering according to some embodiments of the present disclosure may be used as the same meaning as in-loop filtering. A filter used for filtering may include at least one of a deblocking filter, a sample offset filter (SAO) filter, an adaptive loop filter (SLF) or a bi-lateral filter. At least one of the deblocking filter, the SAO filter, the ALF and/or the bi-lateral filter may sequentially apply to a reconstructed picture, thereby generating the modified reconstructed picture. The order of applying the filter may be preset in the image encoding/decoding apparatus. In an example, after the deblocking filter applies to the reconstructed picture, the SAO filter may apply. In another example, after the deblocking filter applies to the reconstructed picture, the ALF may apply. In the present disclosure, filtering may be performed by at least one of the filter 160 of FIG. 2 and/or the filter 240 of FIG. 3.

The deblocking filter may eliminate distortion generated at a boundary of a reconstructed picture. For example, the deblocking filter may derive a target boundary which is a boundary between blocks in the reconstructed picture, and set a boundary strength (BS) for the target boundary. The image encoding/decoding apparatus may perform deblocking filtering on the target boundary, by applying filtering based on the set boundary strength to the target boundary. Here, the boundary strength may be determined based on at least one of prediction modes of two blocks adjacent to the target boundary, a motion vector difference, whether reference pictures are the same, or presence/absence of a non-zero efficient coefficient.

As another example, the SAO filter may compensate for an offset difference between a reconstructed picture and an original picture in units of samples. The SAO filter may be implemented by a filter type such as a band offset filter or an offset filter. When the SAO filter is used, samples may be classified into different categories according to the SAO filter type, and a predetermined offset value may be added to each sample based on the category. Information on the SAO filter may include at least one of information on whether to apply the SAO filter, SAO filter type information and/or SAO offset value information. In an example, the SAO filter may be limited to apply to a reconstructed picture, to which the deblocking filter applies.

The ALF may be a sample unit filter for applying filter coefficients according to a filter shape to a reconstructed picture. The image encoding apparatus may signal at least one of whether to apply the ALF, the shape of the ALF and/or a filter coefficient, by comparing a reconstructed picture with an original picture. That is, information on the ALF may include at least one of information on whether to apply the ALF, ALF filter shape information and/or ALF filtering coefficient information. In an example, the ALF may be limited to apply to a reconstructed picture, to which the deblocking filter applies.

Overview of Deblocking Filter

Figure 19:
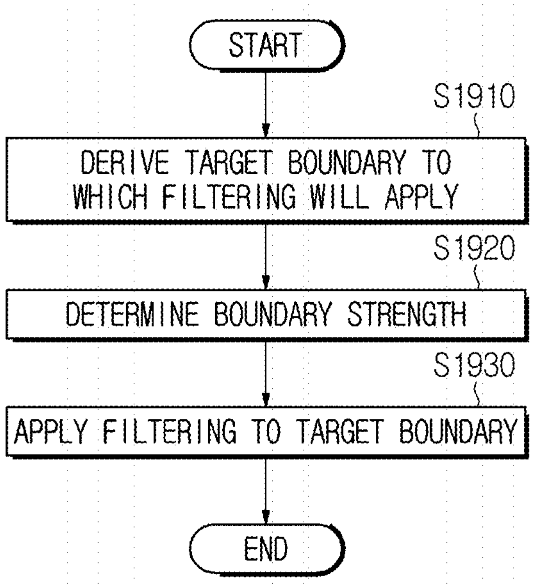
FIG. 19 is a view illustrating an application method of a deblocking filter.

FIG. 19 is a view illustrating an application method of a deblocking filter.

As described above, a deblocking filter may apply to a reconstructed picture. The deblocking filter may apply to a boundary of each CU (or TU) included in a current block, based on the encoding/decoding order of a picture.

In some embodiments, the deblocking filter may first apply to a vertical boundary of a CU and then apply to a horizontal boundary of an encoding/decoding block. Alternatively, the deblocking filter may first apply to a horizontal boundary of a CU and then the apply to a vertical boundary of the CU. The deblocking filter may apply to boundaries of all CUs, boundaries of all subblocks in all CUs, boundaries of all TUs and/or boundaries of all subblocks in all TUs.

Referring to FIG. 19, the image encoding/decoding apparatus may derive a target boundary to which deblocking filtering will apply (S1910). In addition, the image encoding/decoding apparatus may determine a boundary strength of the target boundary (S1920). In an example, the boundary strength bS may be determined according to a condition of a transform block adjacent to the target boundary. In the present disclosure, the boundary strength may also be called a boundary filtering strength or a filtering strength. In the following description, when the target boundary is a vertical boundary, based on the target boundary, a left block may be defined as a P block and a right block may be defined as a Q block. In addition, when the target boundary is a horizontal boundary, based on the target boundary, a top block may be defined as a P block and a bottom block may be defined as a Q block. In addition, the P block sample may be denoted by $p_0$, and the Q block sample may be denoted by $q_0$. Here, p and q may be samples facing the target boundary in the P block and the Q block. For example, $p_0$ may be a sample of a left or top block adjacent to the target boundary, and $q_0$ may be a sample of a right or bottom block adjacent to the target boundary.

In an example, when block based quantized residual domain differential pulse-code modulation (BDPCM) applies to the P block sample and the Q block sample included in one luma block, the boundary strength for the target boundary may be determined to a first value (e.g., 0).

In another example, when a P block sample and a Q block sample included in one CU is intra-predicted, the boundary strength for the target boundary may be determined to a third value (e.g., 2). As another example, when the target boundary is a boundary of a TU and combined inter and intra prediction (CIIP) applies to the P block sample and Q block sample included in one CU, the boundary strength for the target boundary may be determined to a third value (e.g., 2). As another example, when the target boundary is a boundary of a TU and at least one of a P block sample and Q block sample included in one TU has a non-zero transform coefficient level, the boundary strength for the target boundary may be determined to be a second value (e.g., 1). As another example, when a prediction mode of a subblock of a CU including a P block sample is different from a prediction mode of a subblock of a CU including a Q block sample, the boundary strength for the target boundary may be determined to be a second value (e.g., 1).

In another example, when a current block is a luma block and at least one of the following conditions is satisfied, the boundary strength for the target boundary may be determined to be a second value (e.g., 1). Meanwhile, when all the above-described conditions are not satisfied, the boundary strength for the target boundary may be determined to be a first value (e.g., 0).

For example, when both a subblock in a CU including a P block sample and a subblock in a CU including a Q block sample are encoded/decoded in an IBC mode and a horizontal or vertical value difference of a motion vector for each subblock is equal to or greater than a value of 4 units in a ¼ luma sample unit, the boundary strength for the target boundary may be determined to be a second value (e.g., 1).

Alternatively, when a subblock in a CU including a P block sample and a subblock in a CU including a Q block sample reference different reference pictures or have different numbers of motion vectors, the boundary strength for the target boundary may be determined to be a second value (e.g., 1).

Alternatively, when one motion vector is used to predict a subblock in a CU including a P block sample and a subblock in a CU including a Q block sample or a difference between horizontal values or vertical values of a motion vector for each subblock is equal to or greater than a value of 4 units in a ¼ luma sample unit, the boundary strength for the target boundary may be determined to be a second value (e.g., 1).

Alternatively, when two motion vectors and two different reference pictures are used to predict a subblock in a CU including a P block sample, two motion vectors for the same reference picture are used to predict a subblock in a CU including a Q block sample, and a difference between horizontal values or vertical values of motion vectors for the same reference picture is equal to or greater than a value of 4 units in a ¼ luma sample unit, the boundary strength for the target boundary may be determined to be a second value.

Alternatively, when two motion vectors for the same reference picture are used to predict a subblock of a CU including a P block sample and two motion vectors for the same reference picture are used to predict a subblock of a CU including a Q block sample, the boundary strength for the target boundary may be determined to be a second value (e.g., 1) if the following first and second conditions are satisfied. Here, a first condition may mean a case where a difference of an absolute value between horizontal components or vertical components is equal to or greater than a value of 4 units in a ¼ luma sample unit for list 0 motion vectors used for prediction of each subblock or a difference in absolute value between horizontal components or vertical components is equal to or greater than a value of 4 units in a ¼ luma sample unit for list 1 motion vectors used for prediction of each subblock. In addition, a second condition may mean a case where a difference in absolute value between horizontal or vertical components is equal to or greater than a value of 4 units in a ¼ luma sample unit for list 0 motion vectors for predicting a subblock in a CU including a P block sample and list 1 motion vectors for predicting a subblock in a CU including a Q block sample or a difference in absolute value between horizontal components or vertical components between a list 1 motion vector for predicting a subblock of a CU including a P block sample and a list 0 motion vector for predicting a subblock of a CU including a Q block sample is equal to or greater than a value of 4 units in a ¼ luma sample unit.

The image encoding/decoding apparatus may apply a deblocking filter to the target boundary based on the boundary strength determined based on the above-described condition (S1930). For example, when the boundary strength of the target boundary is determined to be a first value (e.g., 0), the image encoding/decoding apparatus may not apply the deblocking filter to the target boundary. The filter strength (e.g., strong or weak) and/or filter length of the deblocking filter applying to the target boundary may be variously determined. Meanwhile, when the sample to be filtered is a luma sample, filtering may be performed using a short filter or a long filter. Alternatively, when the sample to be filtered is a chroma sample, filtering may be performed using a chroma filter.

Determination of Sample to be Filtered

Reconstructed samples pi,k and qj,k, to which a deblocking filter applies, may be specified in a vertical boundary as shown in Equation 3 below.

$$qj,k = recPicture[xCb + xB1 + j][yCb + yB1 + k] \qquad \text{[Equation 3]}$$
$$pi,k = recPicture[xCb + xB1 - i - 1][yCb + yB1 + k]$$

Reconstructed samples pi,k and qj,k, to which filtering applies, may be specified in a horizontal boundary as shown in Equation 4 below.

$$pi,k = recPicture[xCb + xB1 + k][yCb + yB1 - i - 1] \qquad \text{[Equation 4]}$$
$$qj,k = recPicture[xCb + xB1 + k][yCb + yB1 + j]$$

In Equations 3 and 4, i has a value of equal to or greater than 0 and equal to or less than a maximum filter length (e.g., maxFilterLengthP) for a P block, j has a value of equal to or greater than 0 and equal to or less than a maximum filter length (e.g., maxFilterLengthQ) for a Q block, and k may have a value equal to or greater than 0 and equal to or less than 3. In addition, xCb and yCb may specify a position (xCb, yCb) of a top-left sample of a current CU on which deblocking filtering is performed, and xBl and yBl may specify a position (xBl, yBl) of a boundary for specifying the P block and the Q block on which deblocking filtering is performed based on (xCb, yCb).

Figure 20:
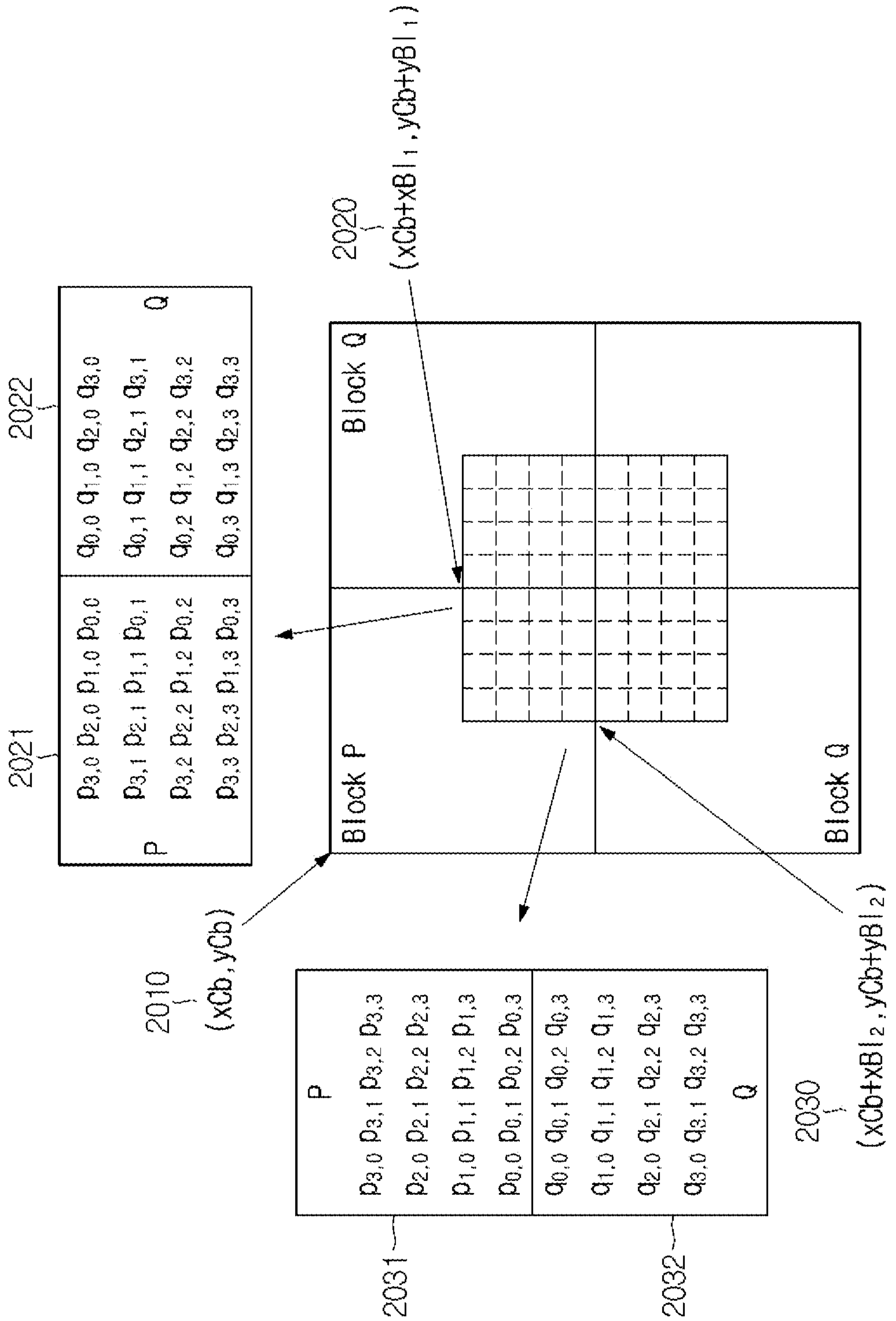
FIG. 20 is a view illustrating a reconstructed sample to which a deblocking filter applies.

FIG. 20 is a view illustrating a reconstructed sample to which a deblocking filter applies.

Referring to FIG. 20, the position of the top-left sample of a current CU may be (xCb, yCb) (2010). When deblocking filtering is performed on a vertical boundary of the current CU, a P block 2021 and a Q block 2022 on which deblocking filtering is performed may be specified using a first sample position ($xCb+xBl_1$, $yCb+yBl_1$) (2020). In addition, when deblocking filtering is performed on a horizontal boundary of the current CU, a P block 2031 and a Q block 2031 on which deblocking filtering is performed may be specified using a second sample position ($xCb+xBl_2$, $yCb+yBl_2$) (2030). In each case, the P blocks 2021 and 2031 may include a plurality of reconstructed samples pi,k. In addition, the Q blocks 2022 and 2032 may include a plurality of reconstructed samples qj,k.

Filter Strength

In case of HEVC, unlike the filter strength of a deblocking filter being controlled by variables β and tC derived from an average quantization parameter $qP_L$, the filter strength of a deblocking filter according to embodiments of the present disclosure may be controlled by adding a predetermined offset according to a luma level of a reconstructed sample to an average quantization parameter $qP_L$. Here, the luma level LL of the reconstructed sample may be derived as shown in Equation 5 below.

$$LL = ((p_{0,0} + p_{0,3} + q_{0,0} + q_{0,3}) >> 2)/(1 << bitDepth) \quad \text{[Equation 5]}$$

where, $p_{0,0}$ and $p_{0,3}$ may denote reconstructed samples adjacent to a target boundary and most spaced apart from each other in the P block, and $q_{0,0}$ and $q_{0,3}$ may denote reconstructed samples adjacent to the target boundary and most spaced apart from each other in the Q block. In addition, bitDepth may denote a bit depth of a reconstructed depth.

A predetermined offset (e.g., qpOffset) added to the average quantization parameter $qP_L$ may be signaled through an SPS and are dependent on a transfer function.

For a reconstructed sample of a luma component, a bilinear filter (or a stronger deblocking filter) may apply to samples located on any one boundary of a relatively large block. Here, the relatively large block may mean a block having a size of 32×32 or more. In contrast, for a reconstructed sample of a chroma component, a strong deblocking filter apply. Here, the strong deblocking filter may be defined as shown in Equation 6 below.

$$p_2' = (3*p_3 + 2*p_2 + p_1 + p_0 + q_0 + 4) >> 3$$

$$p_1' = (2*p_3 + p_2 + 2*p_1 + p_0 + q_0 + q_1 + 4) >> 3$$

$$p_0' = (p_3 + p_2 + p_1 + 2*p_0 + q_0 + q_1 + q_2 + 4) >> 3$$

where, $p_1$ to $p_3$ may denote reconstructed samples in the P block, and $q_0$ to $q_2$ may denote reconstructed samples in the Q block. Filtered reconstructed samples $p_0'$ to $p_2'$ in the P block may be derived using the reconstructed samples in the P block and the reconstructed samples in the Q block.

In the present disclosure, the strong deblocking filter applying to the reconstructed sample of the chroma component may be referred to as a chroma filter. The chroma filter may apply to an 8×8 chroma sample grid and may be used for both horizontal and vertical boundaries. In an example, the chroma filter may be selected only when both the horizontal and vertical edges of the chroma block are equal to or greater than 8 chroma sample units and all the following first to third conditions are satisfied. Here, the first condition may mean that the boundary strength of the chroma block is equal to that of the relatively large luma block. For example, when the boundary strength of the chroma block has a second value (e.g., 1) or a third value (e.g., 2), the chroma filter may be selected. The second condition and the third condition may be equal to a strong filter determination condition for the reconstructed sample of the luma component, for example, an on/off determination condition and a strong filter determination condition.

In addition, the boundary strength for chroma filtering may be modified based on the attributes of an adjacent block adjacent to the boundary of the current block as shown in Table 2.

TABLE 2

| Conditions | Y (luma) | U (chroma) | V (chroma) |
|---|---|---|---|
| At least one of the adjacent blocks is intra | 2 | 2 | 2 |
| At least one of the adjacent blocks has non-zero transform coefficients | 1 | 1 | 1 |
| Absolute difference between the motion vectors that belong to the adjacent blocks is greater than or equal to one integer luma sample | 1 | N/A | N/A |
| Motion prediction in the adjacent blocks refers to vectors is different | 1 | N/A | N/A |
| Otherwise | 0 | 0 | 0 |

Referring to Table 2, when at least one adjacent block adjacent to the current block is intra-predicted, the boundary strength of the current block may have a third value (e.g., 2) for all color components (e.g., Y, U and V). In addition, when at least one adjacent block adjacent to the current block has non-zero transform coefficients, the boundary strength of the current block may have a second value (e.g., 1) for all color components. In addition, when an absolute difference value between motion vectors of adjacent blocks adjacent to the current block is equal to or greater than one integer luma sample, the boundary strength of the current block may be present only for the luma component and may have a second value (e.g., 1). In addition, when motion prediction references different motion vectors in adjacent blocks adjacent to the current block, the boundary strength of the current block may be present only for the luma component and may have a second value (e.g., 1). Meanwhile, when all the above-described conditions are not satisfied, the boundary strength of the current block may have a first value (e.g., 0) for all color components.

In an example, the deblocking filter may apply based on an 8×8 grid. For example, the deblocking filter may apply to a CU boundary aligned in the 8×8 grid and coinciding with a subblock boundary. Hereinafter, the subblock boundary may include a PU boundary in a subblock based TMVP and/or affine mode and a TU boundary in an SBT and/or ISP mode. In the SBT and/or ISP mode, a deblocking filtering process for the TU boundary may proceed with the same logic as in the case of HEVC. For example, when there are non-zero coefficients across a block edge in a subblock, deblocking filtering for the TU boundary may be performed. In addition, in the subblock based TMVP and/or affine mode, the deblocking filtering process for the PU boundary may proceed with the same logic as in the case of HEVC. For example, based on a difference value between motion vectors of the adjacent subblock and a difference value between reference pictures, deblocking filtering for the PU boundary may be performed.

Problems of Related Art

When each subpicture is treated as a picture, each subpicture may be independently encoded/decoded. Here, independent encoding/decoding may mean that a block split structure (e.g., single tree structure, dual tree structure, etc.) for a subpicture, a prediction mode (e.g., intra prediction, inter prediction, etc.), an encoding/decoding order, etc. are determined regardless of encoding/decoding information of different subpictures. For example, when each of a first subpicture and a second subpicture are treated as a picture, the first subpicture may be encoded/decoded based on intra prediction and the second subpicture may be encoded/decoded based on inter prediction. Whether each subpicture is treated as a picture may be signaled using subpic_treated_as_pic_flag in higher level syntax (e.g., SPS syntax) as described above with reference to FIG. 15. For example, subpic_treated_as_pic_flag for a subpicture which is not treated as a picture may have a first value (e.g., 0). In contrast, subpic_treated_as_pic_flag for a subpicture treated as a picture may have a second value (e.g., 1).

Meanwhile, for the boundary of each subpicture, in-loop filtering (e.g., deblocking filtering) across the boundary may be performed. In the present disclosure, in-loop filtering across the boundary of the subpicture may be referred to as across in-loop filtering or across filtering. In addition, a filter for across filtering may be referred to as an across in-loop filter or an across filter. Whether the across filter is applicable to the boundary of each subpicture may be signaled using loop_fliter_across_subpic_enabled_flag in the SPS described above with reference to FIG. 15. For example, loop_fliter_across_subpic_enabled_flag for a subpicture, to which the across filter is not applicable, may have a first value (e.g., 0). In contrast, loop_fliter_across_subpic_enabled_flag for a subpicture, to which the across filter is applicable, may have a second value (e.g., 1).

Whether the across filter is applicable to the boundary of the subpicture may be independently determined regardless of whether the subpicture is treated as a picture. In addition, whether the across filter is applicable to the boundary of the subpicture may be independently determined regardless of the attributes of an adjacent subpicture adjacent to the boundary of the subpicture.

Even though the across filter is not applicable to the boundary of a current subpicture treated as a picture, as the across filtering is performed on the boundary of the adjacent subpicture adjacent to the boundary, a region treated as a picture may be reduced in a current subpicture (or a collocated subpicture).

Figure 21:
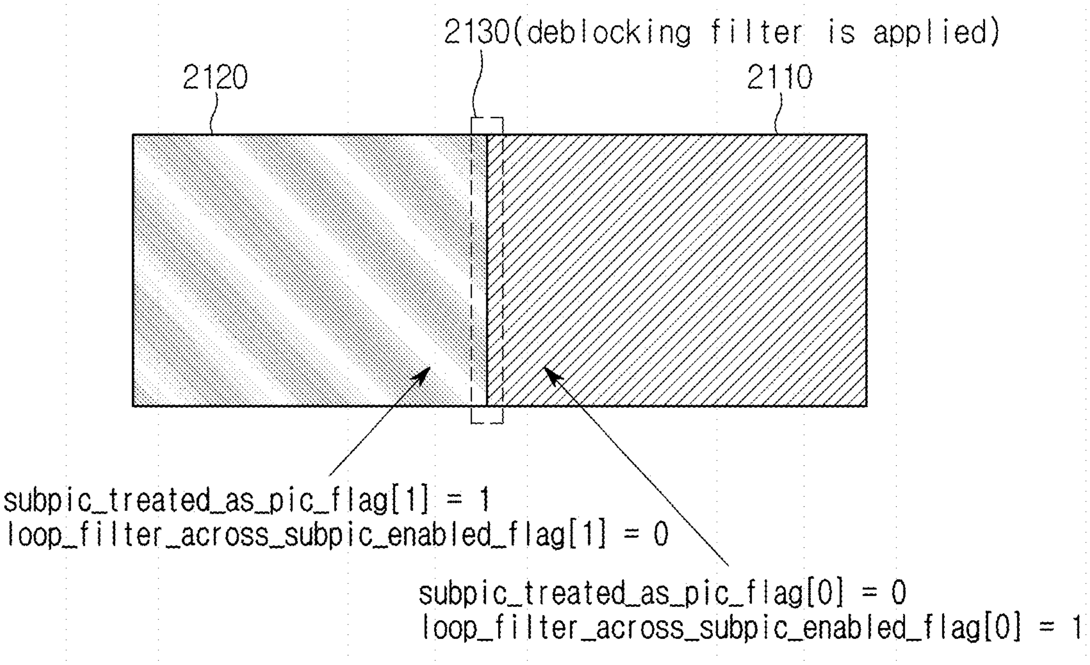
FIGS. 21 and 22 are views illustrating examples of reducing a region treated as a picture in a subpicture.
Figure 22:
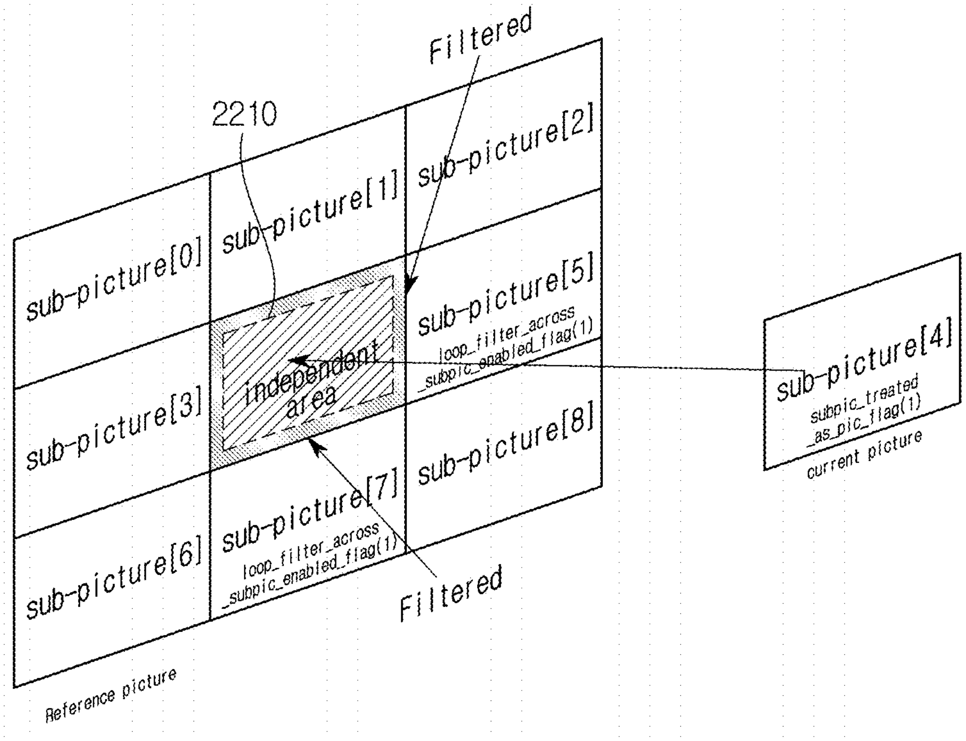

FIGS. 21 and 22 are views illustrating examples of reducing a region treated as a picture in a subpicture.

First, referring to FIG. 21, a first subpicture 2110 may not be treated as a picture (e.g., subpic_treated_as_pic_flag[0]=0). In addition, the across filter may apply to a left vertical boundary of the first subpicture 2110 (e.g., loop_filter_across_subpic_enabled_flag[0]=1).

In contrast, a second subpicture 2120 adjacent to the left vertical boundary of the first subpicture 2110 may be treated as a picture (e.g. subpic_treated_as_pic_flag[1]=1). In addition, the across filter is not applicable to the right vertical boundary of the second subpicture 2120 (e.g., loop_filter_across_subpic_enabled_flag[1]=0).

Even though the across filter is not applicable to the right vertical boundary of the second subpicture 2120 treated as a picture, as the across filter applies to the left vertical boundary of the adjacent first subpicture 2110, the right vertical boundary of the second subpicture 2120 may be filtered along with the left vertical boundary of the first subpicture 2120.

As a result, in a filtered region 2130, sample values may be changed using the sample values of the first subpicture 2110 and the sample values of the second subpicture 2120. Therefore, in the second subpicture 2120, a region treated as a picture may be reduced to a region excluding the filtered right boundary.

As another example, referring to FIG. 22, a fourth subpicture Sub-picture[4]) which is a current picture including the current block may be treated as a picture (e.g., subpic_treated_as_pic_flag=1). When a subblock based temporal motion vector prediction (TMVP) mode applies to the current block, a fourth subpicture Sub-picture[4] in the reference picture may be referenced as a collocated subpicture for the current block. That is, the fourth subpicture Sub-picture[4] in the reference picture may include a temporal reference block (collocated reference block) for the current block.

In the fourth subpicture Sub-picture[4] in the reference picture, it is assumed that the across filter applies to the left vertical boundary and the top horizontal boundary and the across filter does not apply to the right vertical boundary and the bottom horizontal boundary.

As the across filter does not apply to the right vertical boundary of the fourth subpicture Sub-picture[4] in the reference picture, but the left vertical boundary of a fifth subpicture Sub-picture[5] adjacent to the right vertical boundary is across-filtered, the right vertical boundary of the fourth subpicture Sub-picture[4] in the reference picture may also be filtered. In addition, as the across filter does not apply to the bottom horizontal boundary of the fourth subpicture Sub-picture[4] in the reference picture but the top horizontal boundary of a seventh subpicture Sub-picture[7] adjacent to the bottom horizontal boundary is across-filtered, the bottom horizontal boundary of the fourth subpicture Sub-picture[4] in the reference picture may also be filtered. As a result, the sample values of the filtered region in the fourth subpicture Sub-picture[4] in the reference picture may be modified using the sample values of different subpictures Sub-picture[0] to Sub-picture[3] and Sub-picture[5] to Sub-picture[8]. Therefore, in the fourth subpicture Sub-picture[4] in the reference picture, a region in which a temporal reference block for the current block may be present may be reduced to the remaining region 2210 excluding the filtered region.

Meanwhile, when independently encoded subpictures are decoded, even though the across filter is not applicable to the boundary of the current subpicture, as across filtering is performed on the boundary of an adjacent subpicture adjacent to the boundary, a problem that the encoding result and the decoding result do not match (that is, decoding error) may occur.

Figure 23:
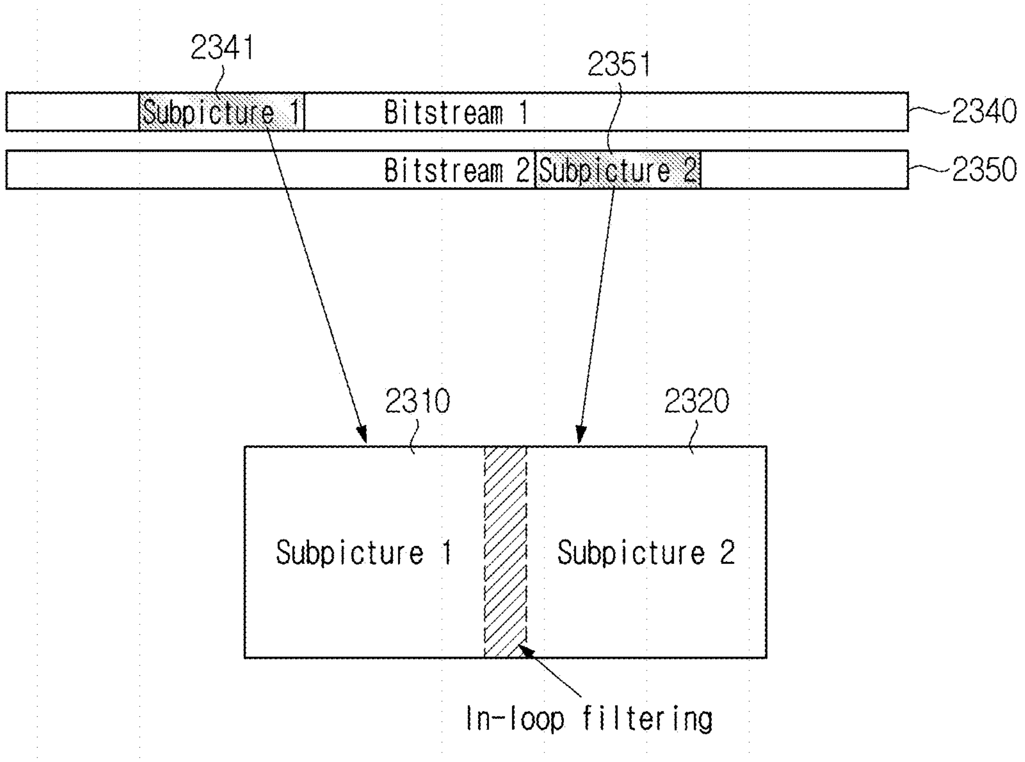
FIGS. 23 and 24 are views illustrating examples in which decoding error of a subpicture occurs.
Figure 24:
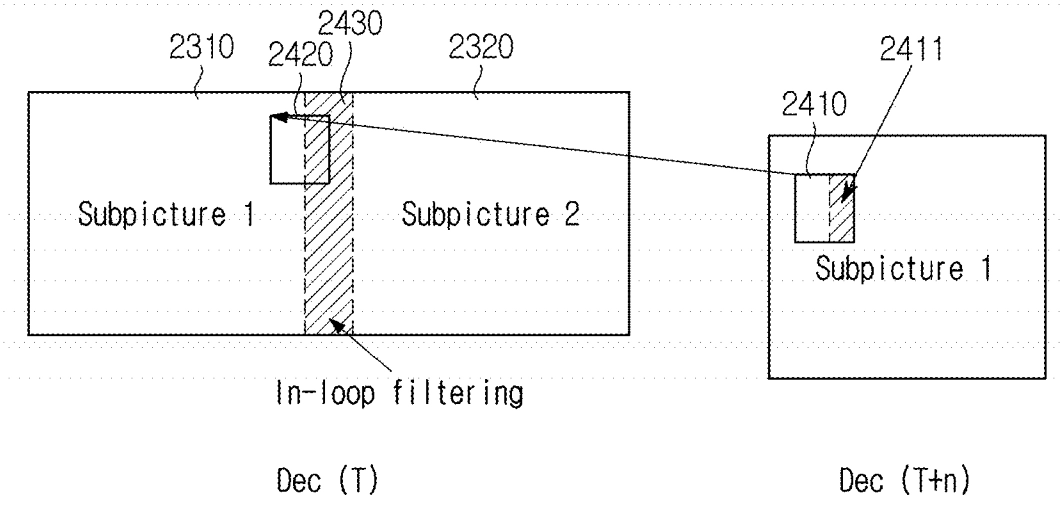

FIGS. 23 and 24 are views illustrating examples in which decoding error of a subpicture occurs.

First, referring to FIG. 23, each of a first subpicture 2310 and a second subpicture 2320 may be treated as a picture and independently encoded. In an example, first information specifying whether each subpicture is treated as a picture may be signaled using subpic_treated_as_pic_flag described above with reference to FIG. 15.

In-loop filtering across the boundary, that is, across filtering, may be performed on the boundary of at least one of the first subpicture 2310 and the second subpicture 2320. For example, across filtering may not be performed on the boundary of the first subpicture 2310 and across filtering may be performed on the boundary of the second subpicture 2320. In an example, second information specifying whether across filtering is able to be performed on the boundary of each subpicture may be signaled using loop_filter_across_subpic_enabled_flag described above with reference to FIG. 15.

Whether across filtering is able to be performed on the boundary of each subpicture may be determined regardless of whether each subpicture is treated as a picture. That is, in the above-described example, the value of loop_filter_across_subpic_enabled_flag may be determined regardless of the value of subpic_treated_as_pic_flag. As a result, even though an across filter does not apply to the boundary of the first subpicture 2310, as the boundary of the second subpicture 2320 is across-filtered, the boundary of the first subpicture 2310 may also be filtered.

Information on each subpicture may include the first information and the second information. In addition, information on each independently encoded subpicture may be signaled through different bitstreams. For example, information 2341 on the first subpicture 2310 may be signaled through a first bitstream 2340 and information 2351 on the second subpicture 2320 may be signaled through a second bitstream 2350.

Meanwhile, in a decoding step, an image decoding apparatus may construct at least one picture including a plurality of subpictures by merging a plurality of bitstreams. For example, the image decoding apparatus may construct one picture including the first subpicture 2310 and the second subpicture 2320, based on the information 2341 on the first subpicture 2310 obtained from the first bitstream 2340 and the information 2351 on the second subpicture 2320 obtained from the second bitstream 2350. In this case, according to the decoding order, the second subpicture may be present at a position adjacent to the right vertical boundary of the first subpicture 2310.

Next, referring to FIG. 24, when a subblock based temporal motion vector prediction (TMVP) mode applies to a current block 2410 included in the first subpicture 2310, at least a partial region in a collocated reference block 2420 for the current block 2410 may be included in a filtered region 2430. As a result, in an encoding step, the temporal reference block 2420 for the current block 2410 does not include the filtered region. However, in a decoding step, the temporal reference block 2420 for the current block 2410 may include the filtered region. Therefore, in the partial region 2411 in the current block 2410 referencing the filtered region, decoding error in which the decoding result and the encoding result does not match may occur.

As described above, in order to solve the problems described above with reference to FIGS. 21 to 24, according to an embodiment of the present disclosure, in-loop filtering across the boundary of the current subpicture may be performed based on whether the current subpicture is treated as a picture. In addition, according to the embodiment of the present disclosure, in-loop filtering across the boundary of the current block may be performed based on whether the boundary of the current block is equal to that of the current subpicture. In addition, according to an embodiment of the present disclosure, in-loop filtering across the boundary of the current subpicture may be performed based on whether in-loop filtering across an adjacent subpicture adjacent to the boundary is able to be performed.

Hereinafter, embodiments of the present disclosure will be described in detail with reference to the accompanying drawings.

Embodiment 1

According to Embodiment 1, whether across filtering is able to be performed on a boundary of a current subpicture may be determined based on whether the current subpicture is treated as a picture.

FIG. 25 is a view illustrating SPS syntax for signaling a subpicture syntax element according to an embodiment of the present disclosure. A description of the SPS syntax of FIG. 25 overlapping the SPS syntax of FIG. 15 will be omitted or simplified.

Referring to FIG. 25, a syntax element subpic_treated_as_pic_flag[i] may specify whether a subpicture is treated as being the same as a general picture in a decoding process. For example, a first value (e.g., 0) of subpic_treated_as_pic_flag[i] may specify that an i-th subpicture included in an individual coding picture of CVS is not treated as a picture. A second value (e.g., 1) of subpic_treated_as_pic_flag[i] may specify that an i-th subpicture included in an individual coding picture of CVS is treated as a picture. When the value of subpic_treated_as_pic_flag[i] is not obtained from a bitstream, the value of subpic_treated_as_pic_flag[i] may be inferred as a first value (e.g., 0).

A syntax element loop_filter_across_subpic_enabled_flag[i] may specify whether in-loop filtering (e.g., deblocking filtering) is able to be performed across the boundary of the i-th subpicture included in the individual coding picture of CVS. For example, a first value (e.g., 0) of loop_filter_across_subpic_enabled_flag[i] may specify that in-loop filtering is not able to be performed across the boundary of the i-th subpicture included in the individual coding picture of CVS. A second value (e.g., 1) of loop_filter_across_subpic_enabled_flag[i] may specify in-loop filtering is able to be performed across the boundary of the i-th subpicture included in the individual coding picture of CVS.

loop_filter_across_subpic_enabled_flag[i] may be signaled only when a subpicture is not treated as being the same as a genera picture in a decoding process. For example, when the i-th subpicture included in the individual coding picture of CVS is not treated as a picture in the decoding process i (e.g., subpic_treated_as_pic_flag[i]=0), loop_filter_across_subpic_enabled_flag[i] may be signaled (2510).

In an example, when loop_filter_across_subpic_enabled_flag[i] is not signaled, the value of loop_filter_across_subpic_enabled_flag[i] may be determined to be a first value (e.g., 0) or a second value (e.g., 1) according to the following condition. When the i-th subpicture included in the individual coding picture of CVS is treated as a picture in the decoding process (e.g., subpic_treated_as_pic_flag[i]=1), the value of loop_filter_across_subpic_enabled_flag[i] may be determined to be a first value (e.g., 0). In other cases, the value of loop_filter_across_subpic_enabled_flag[i] may be determined to be a second value (e.g., 1).

In an example, for bitstream conformance, when the value of subpic_treated_as_pic_flag[i] is a second value (e.g., 1), a constraint that the value of loop_filter_across_subpic_enabled_flag[i] is a first value (e.g., 0) may apply.

FIG. 26 is a view illustrating an example of a process of filtering luma samples based on the SPS syntax of FIG. 25.

Referring to FIG. 26, the luma samples may be filtered using a long filter based on predetermined filtering constraints.

The luma samples may include a P block sample $p_0$ located on the left or top and a Q block sample $q_0$ located on the right or bottom, based on a target boundary on which filtering is performed.

In case of the P block sample $p_0$, when the number nDp of P block samples $p_0$ to be filtered is greater than 0 and at least one of the following constraints is satisfied, the number nDp of P block samples $p_0$ to be filtered may be changed to 0.

Constraint 1: a quantization, transform and in-loop filtering process are bypassed (e.g., cu_transquant_bypass_flag==1), for a current CU including a coding block having a P block sample $p_0$ Constraint 2: a palette mode applies (e.g., pred_mode_plt_flag==1), for a current CU including a coding block having a P block sample $p_0$ Constraint 3: an edge of the current CU including a coding block having a P block sample $p_0$ is a boundary of a subpicture and the current CU is treated as a picture (e.g., subpic_treated_as_pic_flag[SubPicIdx]==1)

In case of the Q block sample $q_0$, when the number nDq of Q block samples $q_0$ to be filtered is greater than 0 and at least one of the following constraints 4 and 5 is satisfied, the number nDq of Q block samples $q_0$ to be filtered may be changed to 0.

Constraint 4: a quantization, transform and in-loop filtering process are bypassed (e.g., cu_transquant_bypass_flag==1), for a current CU including a coding block having a Q block sample $q_0$ Constraint 5: a palette mode applies (e.g., pred_mode_plt_flag==1), for a current CU including a coding block having a Q block sample $q_0$ FIG. 27 is a view illustrating another example of a process of filtering luma samples based on the SPS syntax of FIG. 25.

Referring to FIG. 27, the luma samples may be filtered using a long filter based on predetermined filtering constraints.

The luma samples may include a P block sample $p_i$ located on the left or top and a Q block sample $q_j$ located on the right or bottom, based on a target boundary on which filtering is performed. Here, i may have a value equal to or greater than 0 and equal to or less than a value obtained by subtracting 1 from a maximum filter length (e.g., maxFilterLengthP) for the P block. In addition, j may have a value equal to or greater than 0 and equal to or less than a value obtained by subtracting 1 from a maximum filter length (e.g., maxFilterLengthQ) for the Q block.

In case of the P block sample $p_i$, when at least one of the following constraints is satisfied, the sample value of the filtered P block sample $p_i'$ may be replaced with the sample value of the input P block sample $p_i$.

Constraint 1: a quantization, transform and in-loop filtering process are bypassed (e.g., cu_transquant_bypass_flag==1), for a current CU including a coding block having a P block sample $p_i$ Constraint 2: a palette mode applies (e.g., pred_mode_plt_flag==1), for a current CU including a coding block having a P block sample $p_i$ Constraint 3: an edge of the current CU including a coding block having a P block sample $p_i$ is a boundary of a subpicture and the current CU is treated as a picture (e.g., subpic_treated_as_pic_flag[SubPicIdx]==1)

According to the above-described filtering constraints, when the sample value of the filtered P block sample $p_i'$ is replaced with the sample value of the input P block sample $p_i$, the P block sample $p_i$ may be treated as not being filtered.

In case of the Q block sample $q_j$, when at least one of the following constraints 4 and 5 is satisfied, the sample value of the filtered Q block sample $q_j'$ may be replaced with the sample value of the input Q block sample $q_j$.

Constraint 4 a quantization, transform and in-loop filtering process are bypassed (e.g., cu_transquant_bypass_flag==1), for a current CU including a coding block having a Q block sample $q_i$ Constraint 5: a palette mode applies (e.g., pred_mode_plt_flag==1), for a current CU including a coding block having a Q block sample $q_i$ According to the above-described filtering constraints, when the sample value of the filtered Q block sample $q_j'$ is replaced with the sample value of the input Q block sample $Q_j$, the Q block sample $q_j$ may be treated as not being filtered.

FIG. 28 is a view illustrating an example of a process of filtering chroma samples based on the SPS syntax of FIG. 25.

Referring to FIG. 28, the chroma samples may be filtered using a strong filter or a weak filter according to predetermined filtering constraints. In an example, the chroma samples may be filtered only when respective color components (e.g., Y, Cb, Cr) are not separately encoded/decoded. For example, the chroma samples may be filtered only when the value of ChromaArrayType specifying the type of a chroma sample array is not 0.

The chroma samples may include a P block sample $p_i$ located on the left and top and a Q block sample $q_i$ located on the right or bottom based on a target boundary on which filtering is performed. Here, i may have a value equal to or greater than 0 and equal to or less than a value obtained by subtracting 1 from a maximum filter length (e.g., maxFilterLengthCbCr) for the chroma block. The P block sample $p_i$ may be specified using a first sample position ($xP_i$, $yP_i$), and the Q block sample $q_i$ may be specified using a second position ($xQ_i$, $yQ_i$).

Using the sample value and position of the P block sample $p_i$, the sample value and position of the Q block sample $q_i$ and a variable $t_c$ as input, the sample value of the filtered P block sample $p_i'$ and the sample value of the filtered Q block sample $q_i'$ may be output.

In an example, when a maximum filter length (e.g., maxFilterLengthCbCr) for the chroma block is 3, strong filtering may be performed on the chroma samples as shown in Equation 7 below.

$$p_0' = \text{Clip3}(p_0 - t_C,\ p_0 + t_C,\ (p_3 + p_2 + p_1 + 2*p_0 + q_0 + q_1 + q_2 + 4) >> 3) \quad \text{[Equation 7]}$$

$$p_1' = \text{Clip3}(p_1 - t_C,\ p_1 + t_C,\ (2*p_3 + p_2 + 2*p_1 + p_0 + q_0 + q_1 + 4) >> 3)$$

$$p_2' = \text{Clip3}(p_2 - t_C,\ p_2 + t_C,\ (3*p_3 + 2*p_2 + p_1 + p_0 + q_0 + 4) >> 3)$$

$$q_0' = \text{Clip3}(q_0 - t_C,\ q_0 + t_C,\ (p_2 + p_1 + p_0 + 2*q_0 + q_1 + q_2 + q_3 + 4) >> 3)$$

-continued $$q_1' = \text{Clip3}(q_1 - t_C, q_1 + t_C, (p_1 + p_0 + q_0 + 2*q_1 + q_2 + 2*q_3 + 4) >> 3)$$

$$q_2' = \text{Clip3}(q_2 - t_C, q_2 + t_C, (p_0 + q_0 + q_1 + 2*q_2 + 3*q_3 + 4) >> 3)$$

where, Clip3(x, y, z) may mean a function for clipping a value of a parameter z to a value between a value of a parameter x and a value of a parameter y.

In contrast, when a maximum filter length (e.g., maxFilterLengthCbCr) for the chroma block is not 3, weak filtering may be performed on the chroma samples as shown in Equation 8 below.

$$\Delta = \text{Clip3}(-t_C, t_C, ((((q_0 - p_0) << 2) + p_1 - q_1 + 4) >> 3)) \quad \text{[Equation 8]}$$

$$p_0' = \text{Clip1}_C(p_0 + \Delta)$$

$$q_0' = \text{Clip1}_C(q_0 - \Delta)$$

where, $\text{Clip1}_C(x)$ may mean a function for clipping a value of a parameter x based on a bit depth of the chroma block.

Meanwhile, the sample value of a filtered P block sample $p_i'$ may be replaced with the sample value of the input P block sample $p_i$, when at least one of Constraints 1 to 3 below is satisfied.

Constraint 1: a quantization, transform and in-loop filtering process are bypassed (e.g., cu_transquant_bypass_flag==1), for a current CU including a coding block having a P block sample $p_i$ Constraint 2: a palette mode applies (e.g., pred_mode_plt_flag==1), for a current CU including a coding block having a P block sample $p_i$ Constraint 3: an edge of the current CU including a coding block having a P block sample $p_i$ is a boundary of a subpicture and the current CU is treated as a picture (e.g., subpic_treated_as_pic_flag[SubPicIdx]==1)

According to the above-described filtering constraints, when the sample value of the filtered P block sample $p_i'$ is replaced with the sample value of the input P block sample $p_i$, the P block sample $p_i$ may be treated as being not filtered.

The sample value of the filtered Q block sample $q_j'$ may be replaced with the sample value of the input Q block sample $q_j$, when at least one of Constraints 4 and 5 below is satisfied.

Constraint 4: a quantization, transform and in-loop filtering process are bypassed (e.g., cu_transquant_bypass_flag==1), for a current CU including a coding block having a Q block sample $q_i$ Constraint 5: a palette mode applies (e.g., pred_mode_plt_flag==1), for a current CU including a coding block having a Q block sample $q_i$ According to the above-described filtering constraints, when the sample value of the filtered Q block sample $q_j'$ is replaced with the sample value of the input Q block sample $Q_j$, the Q block sample $q_j$ may be treated as being not filtered.

Hereinafter, a filtering method according to Embodiment 1 of the present disclosure will be described in detail.

Figure 29:
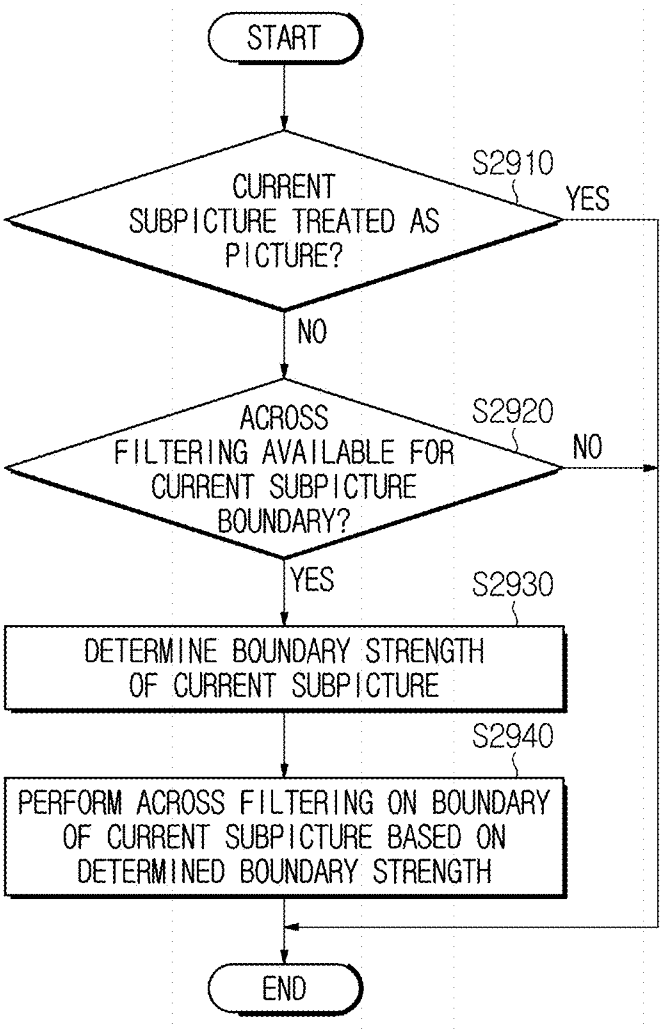
FIG. 29 is a flowchart illustrating a filtering method based on a subpicture structure according to an embodiment of the present disclosure.

FIG. 29 is a flowchart illustrating a filtering method based on a subpicture structure according to an embodiment of the present disclosure. The filtering method of FIG. 29 may be performed by the image encoding apparatus of FIG. 2. For example, steps S2910 to S2940 may be performed by the filter 160 of the image encoding apparatus 100. Alternatively, the filtering method of FIG. 29 may be performed by the image decoding apparatus of FIG. 3. For example, steps S2910 to S2940 may be performed by the filter 240 of the image decoding apparatus 200.

In an encoding step, the filtering method of FIG. 29 may be performed across the boundary of the current picture including a reconstructed current block. Alternatively, in a decoding step, the filtering method of FIG. 29 may be performed across the boundary of the current picture including a decoded current block. Hereinafter, in-loop filtering across the boundary of the subpicture is referred to as across filtering.

Referring to FIG. 29, an image encoding/decoding apparatus may determine whether a current subpicture including the current block is able to be treated as a picture (S2910).

The current subpicture being treated as a picture may mean the current subpicture is independently encoded/decoded regardless of encoding/decoding information of other subpictures. For example, the current subpicture may be encoded using an inter prediction mode, and an adjacent subpicture adjacent to the current subpicture may be encoded/decoded using an intra prediction mode.

In the encoding step, information specifying whether the current subpicture is able to be treated as a picture may be encoded using subpic_treated_as_pic_flag in higher level syntax (e.g., SPS (sequence parameter set) syntax). For example, when subpic_treated_as_pic_flag has a first value (e.g., 0), the current subpicture may not be treated as a picture. In contrast, when subpic_treated_as_pic_flag has a second value (e.g., 1), the current subpicture may be treated as a picture.

In the decoding step, whether the current subpicture is able to be treated as a picture may be determined using the value of subpic_treated_as_pic_flag obtained from higher level syntax. In an example, when subpic_treated_as_pic_flag is not obtained, subpic_treated_as_pic_flag may be inferred as having a first value (e.g., 0).

When the current subpicture is not treated as a picture ('NO' of S2910), whether across filtering (e.g., deblocking filtering) is able to be performed on the boundary of the current subpicture may be determined (S2920).

In the encoding step, information specifying whether across filtering is able to be performed on the boundary of the current subpicture may be encoded using loop_filter_across_subpic_enabled_flag in higher level syntax (e.g., SPS (sequence parameter set) syntax). For example, when loop_filter_across_subpic_enabled_flag has a first value (e.g., 0), across filtering may not be performed on the boundary of the current subpicture. In contrast, when loop_filter_across_subpic_enabled_flag has a second value (e.g., 1), across filtering may be performed on the boundary of the current subpicture.

In the decoding step, whether across filtering is able to be performed on the boundary of the current subpicture c may be determined based on a value of loop_filter_across_subpic_enabled_flag obtained from higher level syntax. In an example, when loop_filter_across_subpic_enabled_flag is not obtained, the value of loop_filter_across_subpic_enabled_flag may be determined based on whether the current subpicture is treated as a picture. For example, when the current subpicture is treated as a picture, loop_filter_across_subpic_enabled_flag may be inferred as having a first value (e.g., 0). In contrast, when the current subpicture is not treated as a picture, loop_filter_across_subpic_enabled_flag may be inferred as having a second value (e.g., 1). In an example, for bitstream conformance, when subpic_treated_as_pic_flag has a second value (e.g., 1), a constraint that loop_filter_across_subpic_enabled_flag has a first value (e.g., 0) may apply.

When across filtering is able to be performed on the boundary of the current subpicture ('YES' of S2920), the image encoding/decoding apparatus may determine the boundary strength of the current subpicture (S2930). In the present disclosure, the boundary strength may be referred to as a boundary filtering strength or filtering strength.

The boundary strength of the current subpicture may be determined to be any one of a first value (e.g., 0) to a third value (e.g., 2) according to a predetermined condition, and a specific determination method was described above with reference to FIG. 19.

The image encoding/decoding apparatus may perform across filtering on the boundary of the current subpicture based on the boundary strength of the current subpicture (S2940). For example, across filtering may be performed on the boundary of the current subpicture only when the boundary strength of the current subpicture has a second value (e.g., 1) or a third value (e.g., 2).

Meanwhile, when across filtering is not able to be performed on the boundary of the current subpicture ('NO' of S2920), the filtering process S2930 and S2940 for the boundary of the current subpicture may be skipped.

In addition, when the current subpicture is treated as a picture ('YES' of S2910), the filtering processes S2930 and S2940 for the boundary of the current subpicture may be skipped.

As described above, according to Embodiment 1 of the present disclosure, in-loop filtering across the boundary of the current subpicture may be performed only when the current subpicture is not treated as a picture. Therefore, it is possible to prevent a region in which the current subpicture is treated as a picture from being reduced.

Embodiment 2

According to Embodiment 2, in-loop filtering across the boundary of the current block may be performed only when a predetermined filtering constraint is not satisfied. For example, when the left or top boundary of the current block is a left or top boundary of the current subpicture or when in-loop filtering is not able to be performed across the boundary of the current subpicture, in-loop filtering across the boundary of the current block may not be performed. Further, as in-loop filtering across the boundary of an adjacent subpicture is performed, when the boundary of the current subpicture is filtered together, according to the predetermined filtering constraint, the number of samples to be filtered in the boundary of the current subpicture may be changed to 0 or the sample values of the filtered samples may be replaced with input sample values.

FIG. 30 is a view illustrating an across filtering process according to an embodiment of the present disclosure.

Referring to FIG. 30, in-loop filtering across the boundary of the current block, for example, one-direction deblocking filtering, may be performed. In an example, whether deblocking filtering across the boundary of the current block is able to be performed may be signaled using filterEdgeFlag. For example, a first value (e.g., 0) of filterEdgeFlag may specify that deblocking filtering across the boundary of the current block is not able to be performed. In contrast, a second value (e.g., 1) of filterEdgeFlag may specify that deblocking filtering across the boundary of the current block is able to be performed.

The value of filterEdgeFlag may be derived as follows.

When the boundary of the current block is a vertical boundary (e.g., edgeType==EDGE_VER), if at least one of Constraints 1 to 5 below is satisfied, filterEdgeFlag may have a first value (e.g., 0).

- Constraint 1: the left boundary of the current coding block is a left boundary of the current picture
- Constraint 2: the left boundary of the current coding block is a left boundary of the current subpicture and deblocking filtering across the boundary of the current subpicture is not able to be performed (e.g., loop_filter_across_subpic_enabled_flag==0)
- Constraint 3: the left boundary of the current coding block is a left boundary of a current tile and in-loop filtering is not able to be performed across the boundary of the current tile (e.g., loop_filter_across_tiles_enabled_flag==0)
- Constraint 4: the left boundary of the current coding block is a left boundary of a current slice and in-loop filtering across the boundary of the current slice is not able to be performed (e.g., loop_filter_across_slices_enabled_flag==0)
- Constraint 5: the left boundary of the current coding block is one of vertical virtual boundaries of the current picture and in-loop filtering is not able to be performed across the virtual boundaries (e.g., VirtualBoundariesDisabledFlag==1)

When the boundary of the current block is a horizontal boundary (e.g., edgeType=EDGE_HOR), if at least one Constraints 6 to 7 is satisfied, filterEdgeFlag may have a first value (e.g., 0).

- Constraint 6: the top boundary of the current coding block is a top boundary of a current picture
- Constraint 7: the top boundary of the current coding block is a top boundary of a current subpicture and deblocking filtering across the boundary of the current block is not able to be performed (e.g., loop_filter_across_subpic_enabled_flag==0)
- Constraint 8: the top boundary of the current coding block is a top boundary of a current tile and deblocking filtering across the boundary of the current tile is not able to be performed (e.g., loop_filter_across_tiles_enabled_flag==0)
- Constraint 9: the top boundary of the current coding block is a top boundary of a current slice and deblocking filtering across the boundary of the current slice is not able to be performed (e.g., loop_filter_across_slices_enabled_flag=0)
- Constraint 10: the top boundary of the current coding block is one of horizontal virtual boundaries of the current picture and in-loop filtering across the virtual boundaries is not able to be performed (e.g., VirtualBoundariesDisabledFlag==1)

When all Constraints 1 to 10 above are not satisfied, filterEdgeFlag may have a second value (e.g., 1). For example, when the left boundary of the current coding block is a left or right boundary of a current subpicture and deblocking filtering across the boundary of the current block is not able to be performed (e.g., loop_filter_across_subpic_enabled_flag[SubPicIdx]==0), filterEdgeFlag may have a second value (e.g., 1). In addition, when the top boundary of the current coding block is a top or bottom boundary of a current subpicture and deblocking filtering across the boundary of the current block is not able to be performed, filterEdgeFlag may have a second value (e.g., 1). The above-described examples may consider the case where in-loop filtering across the boundary is performed on an adjacent subpicture adjacent to the boundary of the current coding block.

Meanwhile, the current coding block may include luma samples and chroma samples. Each of the luma samples and the chroma samples may include a P block sample $p_0$ located on the left or top and a Q block sample $q_0$ located on the right or bottom, based on a target boundary on which filtering is performed. Alternatively, Each of the luma samples and the chroma samples may include a P block sample $p_i$ located on the left or top and a Q block sample q located on the right or bottom, based on a target boundary on which filtering is performed. Here, i may have a value equal to or greater than 0 and equal to or less than a value obtained by subtracting 1 from a maximum filter length (e.g., maxFilterLengthP) for the P block. In addition, j may have a value equal to or greater than 0 and equal to or less than a value obtained by subtracting 1 from a maximum filter length (e.g., maxFilterLengthQ) for the Q block. Hereinafter, a process of performing across filtering on the luma samples and the chroma samples will be described in detail with reference to FIGS. 31 to 33.

FIGS. 31 and 32 are views illustrating an across filtering process on luma samples according to an embodiment of the present disclosure.

First, referring to FIG. 31, the number of luma samples to be filtered using a short filter may be changed to 0 according to predetermined filtering constraints. In addition, luma samples filtered using a short filter may be treated as being not filtered according to predetermined filtering constraints.

For example, when the number nDp of P block samples $p_0$ to be filtered is greater than 0 and a palette mode applies to a current CU including a coding block having a P block sample $p_0$ (e.g., pred_mode_plt_flag==1), the number nDp of P block samples $p_0$ to be filtered may be changed to 0.

In addition, when the number nDq of Q block samples $q_0$ to be filtered is greater than 0 and a palette mode applies to a current CU including a coding block having a Q block sample $q_0$, the number nDq of Q block sample $q_0$ to be filtered may be changed to 0.

In addition, when in-loop filtering is not able to be performed across the boundary of the subpicture including the P block sample $p_i$ (e.g., loop_filter_across_subpic_enabled_flag[subPicIdxP]==0), the sample value of the P block sample $p_i'$ filtered using the Q block sample $q_j$ may be replaced with the sample value of the input P block sample $p_i$.

Next, referring to FIG. 32, luma samples filtered using a long filter may be treated as being not filtered according to the predetermined filtering constraints.

For example, when a palette mode applies to a current CU including a coding block having a P block sample $p_i$ (e.g., pred_mode_plt_flag==1), the sample value of the filtered P block sample $p_i'$ may be replaced with the sample value of the input P block sample $p_i$.

In addition, when a palette mode applies to a current CU including a coding block having a Q block sample $q_j$ (e.g., pred_mode_plt_flag==1), the sample value of the filtered Q block sample $q_j'$ may be replaced with the sample value of the input Q block sample $q_j$.

In addition, when in-loop filtering across the boundary of a subpicture including a P block sample $p_i$ is not able to be performed (e.g., loop_filter_across_subpic_enabled_flag [subPicIdxP]==0), the sample value of the P block sample $p_i'$ filtered using the Q block sample $q_j$ may be replaced with the sample value of the input P block sample $p_i$.

FIG. 33 is a view illustrating an across filtering process on chroma samples according to an embodiment of the present disclosure.

Referring to FIG. 33, the filtered chroma samples may be treated as being not filtered according to the predetermined filtering constraints.

For example, when a palette mode applies to a current CU including a coding block having a P block sample $p_i$ (e.g. pred_mode_plt_flag==1), the sample value of the filtered P block sample $p_i'$ may be replaced with the sample value of the input P block sample $p_i$.

In addition, when a palette mode applies to a current CU including a coding block having a Q block sample $q_j$, the sample value of the filtered Q block sample $q_j'$ may be replaced with the sample value of the input Q block sample $q_j$.

In addition, when in-loop filtering across the boundary of a subpicture including a P block sample $p_i$ is not able to be performed (e.g., loop_filter_across_subpic_enabled_flag [subPicIdxP]==0), the sample value of the P block sample $p_i'$ filtered using the Q block sample $q_j$ may be replaced with the sample value of the input P block sample $p_i$.

Hereinafter, a filtering method according to Embodiment 2 of the present disclosure will be described in detail.

Figure 34:
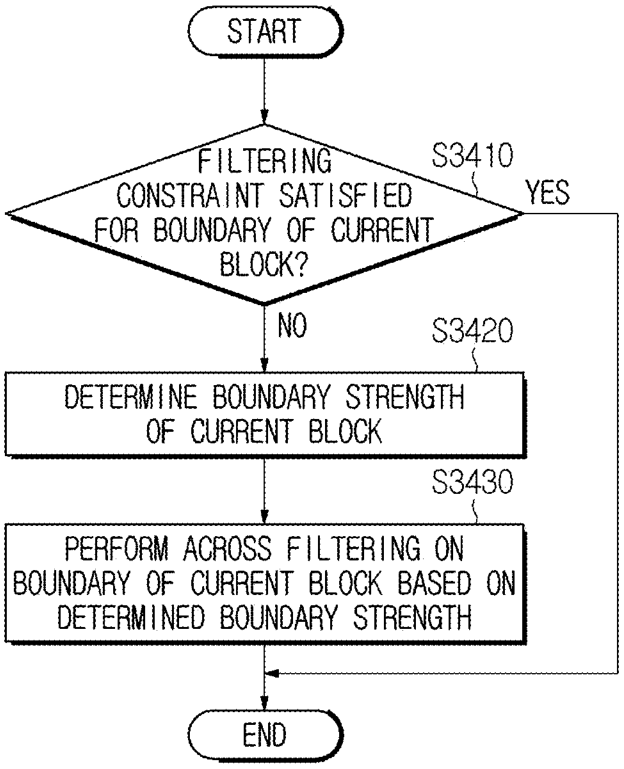
FIG. 34 is a flowchart illustrating a filtering method based on a subpicture structure according to an embodiment of the present disclosure.

FIG. 34 is a flowchart illustrating a filtering method based on a subpicture structure according to an embodiment of the present disclosure. The filtering method of FIG. 34 may be performed by the image encoding apparatus of FIG. 2. For example, steps S3410 to S3440 may be performed by the filter 160 of the image encoding apparatus 100. Alternatively, the filtering method of FIG. 34 may be performed by the image decoding apparatus of FIG. 3. For example, steps S3410 to S3440 may be performed by the filter 240 of the image decoding apparatus 200.

In an encoding step, the filtering method of FIG. 34 may be performed across the boundary of the current picture including a reconstructed current block. Alternatively, in a decoding step, the filtering method of FIG. 34 may be performed across the boundary of the current picture including a decoded current block. Hereinafter, in-loop filtering across the boundary of the subpicture is referred to as across filtering.

Referring to FIG. 34, an image encoding/decoding apparatus may determine whether a predetermined filtering constraint is satisfied for a boundary of a current block (S3410). Here, the filtering constraint may mean that across filtering is not able to be performed on the boundary of the current block.

A specific example of the filtering constraint has been described with reference to FIGS. 30 to 33. For example, the filtering constraint may include the case where the left boundary of the current block is a left boundary of a current subpicture and across filtering is not able to be performed on the boundary of the current subpicture (e.g., loop_filter_across_subpic_enabled_flag[SubPicIdx]==0). In addition, the filtering constraint may include the case where the top boundary of the current block is a top boundary of a current subpicture and across filtering is not able to be performed on the boundary of the current subpicture. In addition, the filtering constraint condition may include the case where the current block includes a P block sample $p_i$ of a luma component located on the left or top based on the boundary of the current block and across filtering is not able to be performed on the boundary of the current subpicture. In addition, the filtering constraint condition may include the case where the current block includes a Q block sample $q_i$ of a luma component located on the left or top based on the boundary of the current block and across filtering is not able to be performed on the boundary of the current subpicture.

When the filtering constraint is not satisfied for the boundary of the current block ('NO' of S3410), the image encoding/decoding apparatus may determine the boundary strength of the current block (S3420). In the present disclosure, the boundary strength may be referred to as a boundary filtering strength or filtering strength.

The boundary strength of the current subpicture may be determined to be any one of a first value (e.g., 0) to a third value (e.g., 2) according to a predetermined condition, and a specific determination method was described above with reference to FIG. 19.

The image encoding/decoding apparatus may perform across filtering on the boundary of the current subpicture based on the boundary strength of the current subpicture (S3440). For example, across filtering may be performed on the boundary of the current subpicture only when the boundary strength of the current subpicture has a second value (e.g., 1) or a third value (e.g., 2).

Meanwhile, when the filtering constraint is satisfied for the boundary of the current subpicture ('NO' of S3420), the filtering process S3420 and S3430 for the boundary of the current subpicture may be skipped.

As described above, according to Embodiment 2 of the present disclosure, in-loop filtering across the boundary of the current subpicture may be performed only when the predetermined filtering constraint is not satisfied. Therefore, it is possible to prevent decoding error that the decoding result of the boundary of the current block does not match the encoding result.

Embodiment 3

According to Embodiment 3, in-loop filtering across the boundary of the current block may be performed only when a predetermined filtering constraint is not satisfied. For example, when in-loop filtering is not able to be performed across the boundary of a current subpicture including a luma sample or a chroma sample located on the left or top of the current block, in-loop filtering across the boundary of the current block may not be performed. In addition, when in-loop filtering is not able to be performed across the boundary of a current subpicture including a luma sample or a chroma sample located on the right or bottom of the current block, in-loop filtering across the boundary of the current block may not be performed.

FIG. 35 is a view illustrating an across filtering process according to an embodiment of the present disclosure.

Referring to FIG. 35, in-loop filtering across the boundary of the current block, for example, one-direction deblocking filtering, may be performed. In an example, whether deblocking filtering across the boundary of the current block is able to be performed may be signaled using filterEdgeFlag described above with reference to FIG. 30.

A value of filterEdgeFlag may be derived as follows.

When the boundary of the current block is a vertical boundary (e.g., edgeType==EDGE_VER), if at least one of the following constraints 1 to 4 is satisfied, filterEdgeFlag may have a first value (e.g., 0).

Constraint 1: the left boundary of the current coding block is a left boundary of a current picture Constraint 2: the left boundary of the current coding block is a left boundary of a current tile and in-loop filtering across the boundary of the current tile is not able to be performed (e.g., loop_filter_across_tiles_enabled_flag==0)

Constraint 3: the left boundary of the current coding block is a left boundary of a current slice and in-loop filtering across the boundary of the current slice is not able to be performed (e.g., loop_filter_across_slices_enabled_flag==0)

Constraint 4: the left boundary of the current coding block is one of vertical virtual boundaries of a current picture and in-loop filtering across the virtual boundaries is not able to be performed (e.g., VirtualBoundariesDisabledFlag==1)

When the boundary of the current block is a horizontal boundary (e.g., edgeType==EDGE_HOR), if at least one of Constraints 5 to 8 below is satisfied, filterEdgeFlag may have a first value (e.g., 0).

Constraint 5: the top boundary of the current coding block is a top boundary of a current picture Constraint 6: the top boundary of the current coding block is a top boundary of a current tile and in-loop filtering across the boundary of the current tile is not able to be performed (e.g., loop_filter_across_tiles_enabled_flag==0)

Constraint 7: the top boundary of the current coding block is a top boundary of a current slice and in-loop filtering across the boundary of the current slice is not able to be performed (e.g., loop_filter_across_slices_enabled_flag==0)

Constraint 8: the top boundary of the current coding block is one of horizontal virtual boundaries of a current picture and in-loop filtering across the virtual boundaries is not able to be performed (e.g., VirtualBoundariesDisabledFlag==1)

When all Constraints 1 to 8 above are not satisfied, filterEdgeFlag may have a second value (e.g., 1).

In the across filtering process of FIG. 35, unlike the across filtering process of FIG. 30, even though deblocking filtering across the boundary of the current block is not able to be performed, in-loop filtering across the boundary of the current block may be performed. This may be in consideration of the case where in-loop filtering across the boundary of an adjacent subpicture adjacent to the boundary of the current subpicture is performed.

Meanwhile, the current coding block may include luma samples and chroma samples. Each of the luma samples and the chroma samples may include a P block sample $p_0$ located on the left or top and a Q block sample $q_0$ located on the right or bottom, based on a target boundary on which filtering is performed. Alternatively, each of the luma samples and the chroma samples may include a P block sample $p_i$ located on the left or top and a Q block sample $q_j$ located on the right or bottom, based on a target boundary on which filtering is performed. Here, i may have a value equal to or greater than 0 and equal to or less than a value obtained by subtracting 1 from a maximum filter length (e.g., maxFilterLengthP) for the P block. In addition, j may have a value equal to or greater than 0 and equal to or less than a value obtained by subtracting 1 from a maximum filter length (e.g., max FilterLengthQ) for the Q block. Hereinafter, a process of performing across filtering on the luma samples and the chroma samples will be described in detail with reference to FIGS. 34 to 36.

FIGS. 36 and 37 are views illustrating an across filtering process on luma samples according to an embodiment of the present disclosure.

First, referring to FIG. 36, the number of luma samples to be filtered using a short filter may be changed to 0 according to predetermined filtering constraints. In addition, luma samples filtered using a short filter may be treated as being not filtered according to predetermined filtering constraints.

For example, when the number nDp of P block samples $p_0$ to be filtered is greater than 0 and a palette mode applies to a current CU including a coding block having a P block sample $p_0$ (e.g., pred_mode_plt_flag==1), the number nDp of P block samples $p_0$ to be filtered may be changed to 0.

In addition, when the number nDq of Q block samples $q_0$ to be filtered is greater than 0 and a palette mode applies to a current CU including a coding block having a Q block sample $q_0$, the number nDq of Q block sample $q_0$ to be filtered may be changed to 0.

In addition, when in-loop filtering across the boundary of the subpicture including the P block sample $p_i$ is not able to be performed (e.g., loop_filter_across_subpic_enabled_flag [subPicIdxP]==0), the sample value of the P block sample $p_i'$ filtered using the Q block sample $q_j$ may be replaced with the sample value of the input P block sample $p_i$.

In addition, when in-loop filtering is not able to be performed across the boundary of subpicture including a Q block sample $q_j$ (e.g., loop_filter_across_subpic_enabled_flag[subPicIdxQ]==0), the sample value of the Q block sample $q_j'$ filtered using the P block sample $p_i$ may be replaced with the sample value of the input Q block sample $q_j$.

Next, referring to FIG. 37, luma samples filtered using a long filter may be treated as being not filtered according to the predetermined filtering constraints.

For example, when a palette mode applies to a current CU including a coding block having a P block sample $p_i$ (e.g., pred_mode_plt_flag==1), the sample value of the filtered P block sample $p_i'$ may be replaced with the sample value of the input P block sample $p_i$.

In addition, when a palette mode applies to a current CU including a coding block having a Q block sample $q_j$, the sample value of the filtered Q block sample $q_j'$ may be replaced with the sample value of the input Q block sample $q_j$.

In addition, when in-loop filtering is not able to be performed across the boundary of a subpicture including a P block sample $p_i$ (e.g., loop_filter_across_subpic_enabled_flag[subPicIdxP]==0), the sample value of the P block sample $p_i'$ filtered using the Q block sample $q_j$ may be replaced with the sample value of the input P block sample $p_i$.

In addition, when in-loop filtering across the boundary of a subpicture including a Q block sample $q_j$ is not able to be performed (e.g., loop_filter_across_subpic_enabled_flag [subPicIdxQ]==0), the sample value of the Q block sample $q_j'$ filtered using the P block sample $p_i$ may be replaced with the sample value of the input Q block sample $q_j$.

FIG. 38 is a view illustrating an across filtering process on chroma samples according to an embodiment of the present disclosure.

Referring to FIG. 38, the filtered chroma samples may be treated as being not filtered according to the predetermined filtering constraints.

For example, when a palette mode applies to a current CU including a coding block having a P block sample $p_i$ (e.g., pred_mode_plt_flag==1), the sample value of the filtered P block sample $p_i'$ may be replaced with the sample value of the input P block sample $p_i$.

In addition, when a palette mode applies to a current CU including a coding block having a Q block sample q (e.g., pred_mode_plt_flag==1), the sample value of the filtered Q block sample $q_j'$ may be replaced with the sample value of the input Q block sample $q_j$.

In addition, when in-loop filtering across the boundary of a subpicture including a P block sample $p_i$ is not able to be performed (e.g., loop_filter_across_subpic_enabled_flag [subPicIdxP]==0), the sample value of the P block sample $p_i'$ filtered using the Q block sample $q_j$ may be replaced with the sample value of the input P block sample $p_i$.

In addition, when in-loop filtering across the boundary of a subpicture including a Q block sample $q_j$ is not able to be performed (e.g., loop_filter_across_subpic_enabled_flag [subPicIdxQ]==0), the sample value of the Q block sample $q_j'$ filtered using the P block sample $p_i$ may be replaced with the sample value of the input Q block sample $q_j$.

The filtering method according to Embodiment 3 of the present disclosure is different from that of Embodiment 2 in the filtering constraints and the filtering method described above with reference to FIG. 34 is applicable without change. Accordingly, a description thereof will be omitted.

As described above, according to Embodiment 3 of the present disclosure, in-loop filtering across the boundary of the current subpicture may be performed only when the predetermined filtering constraint is not satisfied. Therefore, it is possible to prevent decoding error that the decoding result of the boundary of the current block does not match the encoding result.

Embodiment 4

According to Embodiment 4, in-loop filtering across the boundary of the current block may be performed only when in-loop filtering across each boundary is able to be performed on both a boundary of a current picture and a boundary of an adjacent picture adjacent to the boundary of a current block.

FIG. 39 is a view illustrating an across filtering process according to an embodiment of the present disclosure.

Referring to FIG. 39, in-loop filtering across the boundary of the current block (e.g., deblocking filtering) may be performed only when a predetermined filtering constraint is not satisfied. Here, the boundary of the current block may include all edges of a subblock and all edges of a transform block.

Constraint 1: the above-described edges are included in the boundary of a picture Constraint 2: the above-described edges are included in the top boundary of a current subpicture and in-loop filtering across the boundary of an adjacent subpicture adjacent to the top boundary is not able to be performed (e.g., loop_filter_across_subpic_enabled_flag[SubPicIdx Above]==0), where, the position of the top-right sample of the current block is (xCtb, yCtb) and the position of the adjacent subpicture may be specified using a first sample position (xCtb, yCtb−1).

Constraint 3: the above-described edges are included in the left boundary of a current subpicture and in-loop filtering across the boundary of an adjacent subpicture adjacent to the left boundary able is not to be performed (e.g., loop_filter_across_subpic_enabled_flag[SubPicIdxLeft]==0), where, the position of the top-left sample of the current block is (xCtb, yCtb) and the position of the adjacent subpicture may be specified using a second sample position (xCtb−1, yCtb).

Constraint 4: the above-described edges are included in the left or top boundary of a current subpicture and deblocking filtering across the boundary of the current block is not able to be performed (e.g., loop_filter_across_subpic_enabled_flag[SubPicIdx]==0), where, the position of the current subpicture may be specified using the position (xCtb, yCtb) of the top-left sample of the current block.

Constraint 5: the above-described edges are included in the virtual boundaries of the current picture and in-loop filtering across the virtual boundaries is not able to be performed (e.g., VirtualBoundariesDisabledFlag==1)

Constraint 6: the above-described edges are included in the boundaries of a current tile and in-loop filtering across the boundaries of the current tile is not able to be performed (e.g., loop_filter_across_tiles_enabled_flag==0)

Constraint 7: the above-described edges are included in the boundaries of a current slice and in-loop filtering across the boundaries of the current slice is not able to be performed (e.g., loop_filter_across_slices_enabled_flag==0)

Constraint 8: the above-described edges are included in the top or bottom boundary of the current slice and deblocking filtering is disabled for the current slice (e.g., slice_deblocking_filter_disabled_flag==1)

Constraint 9: the above-described edges are included in the current slice and deblocking filtering is disabled for the current slice (e.g., slice_deblocking_filter_disabled_flag==1)

Constraint 10: the above-described edges do not correspond to the boundary of a 4×4 luma sample grid Constraint 11: the above-described edges do not correspond to the boundary of an 8×8 chroma sample grid Constraint 12: as the edges of a luma component, block based delta pulse code modulation (BDPCM) applies to both sides of each edge (e.g., intra_bdpcm_luma_flag==1), where, BDPCM may mean a coding mode in which a quantized residual sample value of a current TU is modified using a quantized residual sample value of a TU adjacent to the current TU.

Constraint 13: as the edges of a chroma component, block based delta pulse code modulation (BDPCM) applies to both sides of each edge (e.g., intra_bdpcm_chroma_flag==1)

Constraint 14: the edges of chroma component subblocks are not equal to those of a TU associated therewith Meanwhile, the filtering process of the luma samples and the chroma samples according to Embodiment 2 described above with reference to FIGS. 31 to 33 is applicable to Embodiment 4 of the present disclosure. In addition, the filtering process of the luma samples and the chroma samples according to Embodiment 3 described above with reference to FIGS. 36 to 38 is applicable to Embodiment 4 of the present disclosure. For example, when a prediction mode of a current block is a palette mode, in-loop filtering (e.g., deblocking filtering) across the boundary of the current block may not be performed.

Hereinafter, a filtering method according to Embodiment 4 of the present disclosure will be described in detail.

Figure 40:
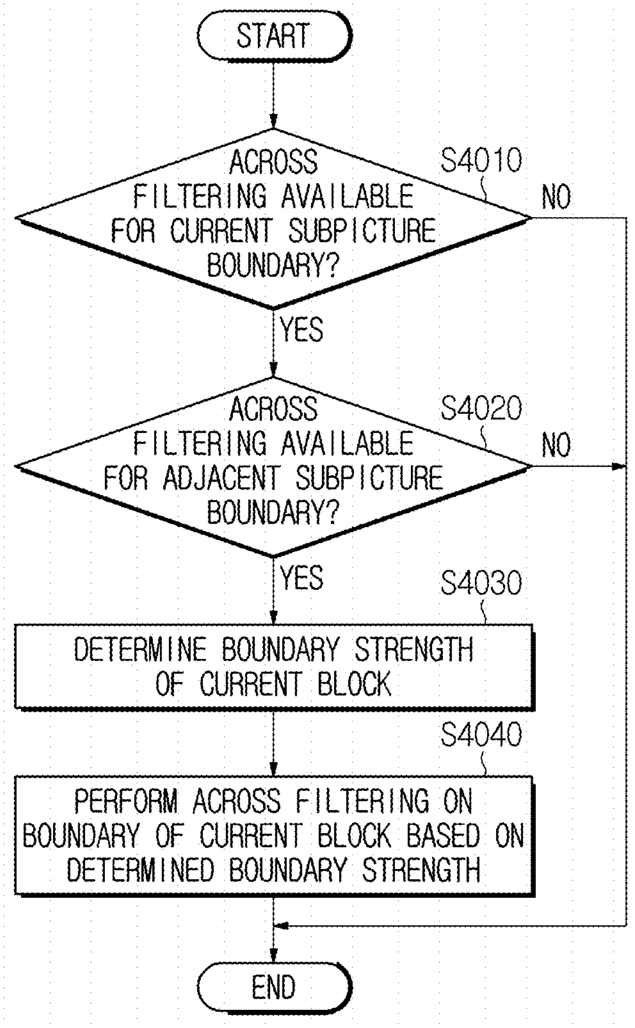
FIG. 40 is a flowchart illustrating a filtering method based on a subpicture structure according to an embodiment of the present disclosure.

FIG. 40 is a flowchart illustrating a filtering method based on a subpicture structure according to an embodiment of the present disclosure. The filtering method of FIG. 40 may be performed by the image encoding apparatus of FIG. 2. For example, steps S4010 to S4040 may be performed by the filter 160 of the image encoding apparatus 100. Alternatively, the filtering method of FIG. 40 may be performed by the image decoding apparatus of FIG. 3. For example, steps S4010 to S4040 may be performed by the filter 240 of the image decoding apparatus 200.

In the encoding step, the filtering method of FIG. 40 may be performed across the boundary of a reconstructed current block. Alternatively, in a decoding step, the filtering method of FIG. 40 may be performed across the boundary of a decoded current block. Hereinafter, in-loop filtering across the boundary of the current block (or current picture/subpicture/slice/tile, etc.) is referred to as across filtering.

Referring to FIG. 40, an image encoding/decoding apparatus may determine whether across filtering is able to be performed on the boundary of a current subpicture including a current block (S4010).

In the encoding step, information specifying whether across filtering is able to be performed on the boundary of the current subpicture may be encoded using loop_filter_across_subpic_enabled_flag in higher level syntax (e.g., sequence parameter set (SPS) syntax). For example, when loop_filter_across_subpic_enabled_flag has a first value (e.g., 0), across filtering is not able to be performed on the boundary of the current subpicture. In contrast, when loop_filter_across_subpic_enabled_flag has a second value (e.g., 1), across filtering may be performed on the boundary of the current subpicture.

In the decoding step, whether across filtering is able to be performed on the boundary of the current subpicture may be determined based on a value of loop_filter_across_subpic_enabled_flag obtained from the higher level syntax. In an example, when loop_filter_across_subpic_enabled_flag is not obtained, the value of loop_filter_across_subpic_enabled_flag may be determined based on whether a current subpicture is treated as a picture. For example, when the current subpicture is treated as a picture, loop_filter_across_subpic_enabled_flag may be inferred as having a first value (e.g., 0). In contrast, when the current subpicture is not treated as a picture, loop_filter_across_subpic_enabled_flag may be inferred as having a second value (e.g., 1). In an example, for bitstream conformance, when subpic_treated_as_pic_flag has a second value (e.g., 1), a constraint that loop_filter_across_subpic_enabled_flag shall have a first value (e.g., 0) may apply.

When across filtering is able to be performed on the boundary of the current subpicture ('YES' of S4010), the image encoding/decoding apparatus may determine whether across filtering is able to be performed on the boundary of an adjacent subpicture adjacent to the boundary of the current block (S4020).

As in the current subpicture, information specifying whether across filtering is able to be performed on the boundary of the adjacent subpicture may be encoded/decoded using loop_filter_across_subpic_enabled_flag in higher level syntax (e.g., sequence parameter set (SPS) syntax).

When across filtering is able to be performed on the boundary of the adjacent subpicture ('YES' of S4020), the image encoding/decoding apparatus may determine that across filtering is performed on the boundary of the current block and determine the boundary strength of the current block (S4030). In the present disclosure, the boundary strength may be referred to as a boundary filtering strength or filtering strength.

The boundary strength of the current block may be determined to be any one of a first value (e.g., 0) to a third value (e.g., 2) according to a predetermined condition, and a specific determination method was described above with reference to FIG. 19.

Meanwhile, in an example, even though across filtering is able to be performed on both the boundary of the current subpicture and the boundary of the adjacent subpicture ('YES' of S4020), when the predetermined filtering constraint is satisfied, across filtering may not be performed on the boundary of the current block. That is, when the filtering constraint is satisfied, the filtering process S4030 and S404 of the boundary of the current block may be skipped.

The filtering constraint may include Constraints 1 to 13 described above with reference to FIG. 39. For example, the filtering constraint may include the case where edges (or boundaries) of the current block are included in a boundary of a picture. In addition, the filtering constraint may include the case where the edges of the current block are included in a left or top boundary of a current subpicture. In addition, the filtering constraint may include the case where the edges of the current block are included in virtual boundaries of the current picture and across filtering is not able to be performed on the virtual boundaries of the current picture (e.g., VirtualBoundariesDisabledFlag==1). In addition, the filtering constraint may include the case where the edges of the current block are included in the boundaries of a current tile and across filtering is not able to be performed on the boundaries of the current tile (e.g., loop_filter_across_tiles_enabled_flag==0). In addition, the filtering constraint may include the case where the edges of the current block are included in the boundaries of a current slice and across filtering is not able to be performed on the boundaries of the current slice (e.g., loop_filtering_across_slices_enabled_flag==0). In addition, the filtering constraint may the case where the edges of the current block are included in a top or bottom boundary of the current slice and across filtering (e.g., deblocking filtering) is disabled for the top or bottom boundary of the current slice (e.g., slice_deblocking_filter_disabled_flag==1).

The image encoding/decoding apparatus may perform across filtering on the boundary of the current block, based on the boundary strength of the current block determined in step S4030 (S4040). For example, across filtering of the boundary of the current block may be performed only when the boundary strength of the current block has a second value (e.g., 1) or a third value (e.g., 2).

In contrast, when across filtering is not able to be performed on the boundary of the current subpicture ('NO' of S4010), the filtering processes S4030 and S404 of the boundary of the current block may be skipped. In addition, when across filtering is not able to be performed on the boundary of an adjacent subpicture adjacent to the boundary of the current subpicture ('NO' of S4020), the filtering processes S4030 and S4040 of the boundary of the current block may be skipped.

Meanwhile, although, in FIG. 40, step S4010 is shown as being performed before step S4020, this is an example and the embodiments of the present disclosure are not limited thereto. For example, step S4020 may be performed before step S4010 or may be performed simultaneously with step S4010.

As described above, according to Embodiment 4 of the present disclosure, in-loop filtering across the boundary of the current subpicture may be performed only when in-loop filtering across each boundary is able to be performed on both the boundary of the current picture and the boundary of the adjacent boundary. Therefore, it is possible to prevent decoding error that the decoding result of the boundary of the current block does not match the encoding result.

Embodiment 5

According to Embodiment 5, in-loop filtering across the boundary of the current block may be performed only when a predetermined filtering constraint is not satisfied. For example, when the prediction mode of the current block is a palette mode and in-loop filtering is not able to be performed across the boundary of the current subpicture including the current subpicture, in-loop filtering across the boundary of the current block may not be performed.

Meanwhile, the current coding block may include luma samples and chroma samples. Each of the luma samples and the chroma samples may include a P block sample $p_0$ located on the left or top and a Q block sample $q_0$ located on the right or bottom, based on a target boundary on which filtering is performed. Alternatively, each of the luma samples and the chroma samples may include a P block sample $p_i$ located on the left or top and a Q block sample q located on the right or bottom, based on a target boundary on which filtering is performed. Here, i may have a value equal to or greater than 0 and equal to or less than a value obtained by subtracting 1 from a maximum filter length (e.g., maxFilterLengthP) for the P block. In addition, j may have a value equal to or greater than 0 and equal to or less than a value obtained by subtracting 1 from a maximum filter length (e.g., maxFilterLengthQ) for the Q block. Hereinafter, a process of performing across filtering on the luma samples and the chroma samples will be described in detail with reference to FIGS. 41 to 43.

FIGS. 41 and 42 are views illustrating an across filtering process on luma samples according to an embodiment of the present disclosure.

First, referring to FIG. 41, the number of luma samples to be filtered using a short filter may be changed to 0 according to predetermined filtering constraints.

For example, when the number nDp of P block samples $p_0$ to be filtered is greater than 0 and a palette mode applies to a current CU including a coding block having a P block sample $p_0$ (e.g., pred_mode_plt_flag==1), the number nDp of P block samples $p_0$ to be filtered may be changed to 0.

In addition, when the number nDq of Q block samples $q_0$ to be filtered is greater than 0 and a palette mode applies to a current CU including a coding block having a Q block sample $q_0$, the number nDq of Q block sample $q_0$ to be filtered may be changed to 0.

In addition, when the number nDp of P block samples $p_0$ to be filtered is greater than 0, the P block sample $p_0$ and the Q block sample $q_0$ are included in different subpictures, and in-loop filtering across the boundary of the subpicture including the P block sample $p_0$ is not able to be performed (e.g., loop_filter_across_subpic_enabled_flag [subPicIdxP]==0), the number nDp of P block samples $p_0$ to be filtered may be changed to 0.

In addition, when the number nDq of Q block samples $q_0$ to be filtered is greater than 0, the Q block sample $q_0$ and the P block sample $p_0$ are included in different subpictures and in-loop filtering across the boundary of the subpicture including the Q block sample $q_0$ is not able to be performed (e.g., loop_filter_across_subpic_enabled_flag [subPicIdxQ]==0), the number nDq of Q block samples $q_0$ to be filtered may be changed to 0.

Next, referring to FIG. 42, luma samples filtered using a long filter may be treated as being not filtered according to predetermined filtering constraints.

For example, when a palette mode applies to a current CU including a coding block having a P block sample $p_i$ (e.g., pred_mode_plt_flag==1), the sample value of the filtered P block sample $p_i'$ may be replaced with the sample value of the input P block sample $p_i$.

In addition, when a palette mode applies to a current CU including a coding block having the Q block sample $q_j$, the sample value of the filtered Q block sample $q_j'$ may be replaced with the sample value of the input Q block sample $q_j$.

In addition, when the P block sample $p_i$ and the Q block sample $q_j$ are included in different subpictures and in-loop filtering across the boundary of the subpicture including the P block sample $p_i$ is not able to be performed (e.g., loop_filter_across_subpic_enabled_flag[subPicIdxP]==0), the sample value of the filtered P block sample $p_i'$ may be replaced with the sample value of the input P block sample $p_i$.

In addition, when the Q block sample $q_j$ and the P block sample $p_i$ are included in different subpictures and in-loop filtering across the boundary of the subpicture including the is not Q block sample $q_j$ able to be performed (e.g., loop_filter_across_subpic_enabled_flag[subPicIdxQ]==0), the sample value of the filtered Q block sample $q_j'$ may be replaced with the sample value of the input Q block sample $q_j$.

FIG. 43 is a view illustrating an across filtering process on chroma samples according to an embodiment of the present disclosure.

Referring to FIG. 43, the filtered chroma samples may be treated as being not filtered according to predetermined filtering constraints.

For example, when a palette mode applies to a current CU including a coding block having a P block sample $p_i$ (e.g., pred_mode_plt_flag==1), the sample value of the filtered P block sample $p_i'$ may be replaced with the sample value of the input P block sample $p_i$.

In addition, when a palette mode applies to a current CU including a coding block having a Q block sample $q_j$ (e.g., pred_mode_plt_flag==1), the sample value of the filtered Q block sample $q_j'$ may be replaced with the sample value of the input Q block sample $q_j$.

In addition, when the P block sample $p_i$ and the Q block sample $q_j$ are included in different subpictures and in-loop filtering across the boundary including the P block sample $p_i$ is not able to be performed (e.g., loop_filter_across_subpic_enabled_flag[subPicIdxP]==0), the sample value of the filtered P block sample $p_i'$ may be replaced with the sample value of the input P block sample $p_i$.

In addition, when the Q block sample $q_j$ and the P block sample $p_i$ are included in different subpictures and in-loop filtering across the boundary of the subpicture including the Q block sample $q_j$ is not able to be performed (e.g., loop_filter_across_subpic_enabled_flag[subPicIdxQ]==0), the sample value of the filtered Q block sample $q_j'$ may be replaced with the sample value of the input Q block sample $q_j$.

Embodiment 5 of the present disclosure is different from Embodiment 2 and Embodiment 3 in the filtering constraints and the filtering method described above with reference to FIG. 34 is applicable without change. Further, the filtering constraints of Embodiment 5 of the present disclosure are equally applicable to Embodiment 4.

As described above, according to Embodiment 5 of the present disclosure, in-loop filtering across the boundary of the current subpicture may be performed only when the predetermined filtering constraint is not satisfied. Therefore, it is possible to prevent decoding error that the decoding result of the boundary of the current block does not match the encoding result.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

FIG. 44 is a view showing a contents streaming system, to which an embodiment of the present disclosure is applicable.

As shown in FIG. 44, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding apparatus comprising:
a memory; and
at least one processor connected to the memory, the at least one processor configured to:
decode a first flag specifying whether in-loop filtering is able to be performed across a boundary of a subpicture from a bitstream; and
perform the in-loop filtering on a boundary of a current block, based on the first flag,
wherein, based on the boundary of the current block being a boundary of a current subpicture including the current block, the in-loop filtering on the boundary of the current block is not performed, based on the first flag for the current subpicture specifying that the in-loop filtering is not able to be performed across the boundary of the current subpicture or the first flag for an adjacent subpicture adjacent to the boundary of the current block specifying that the in-loop filtering is not able to be performed across the boundary of the adjacent subpicture.

2. The image decoding apparatus of claim 1, wherein, based on the boundary of the current block satisfying a predetermined filtering constraint, the in-loop filtering on the boundary of the current block is not performed.

3. The image decoding apparatus of claim 2, wherein the filtering constraint comprises a case where the boundary of the current block is a boundary of a current picture including the current block.

4. The image decoding apparatus of claim 2, wherein the filtering constraint comprises a case where the boundary of the current block is virtual boundaries of a current picture including the current block.

5. The image decoding apparatus of claim 2, wherein the filtering constraint comprises a case where the boundary of the current block is a boundary of a current tile including the current block and the in-loop filtering is not able to be performed across the boundary of the current tile.

6. The image decoding apparatus of claim 2, wherein the filtering constraint comprises a case where the boundary of the current block is a boundary of a current slice including the current block and the in-loop filtering is not able to be performed across the boundary of the current slice.

7. The image decoding apparatus of claim 2, wherein the filtering constraint comprises a case where the boundary of the current block is a left or top boundary of a current slice including the current block and the in-loop filtering is disabled for the current slice.

8. The image decoding apparatus of claim 1, wherein the in-loop filtering comprises deblocking filtering.

9. The image decoding apparatus of claim 1, wherein, based on a prediction mode of the current block being a palette mode, the in-loop filtering on the boundary of the current block is not performed.

10. The image decoding apparatus of claim 1, wherein the at least one processor, to perform the in-loop filtering, further configured to:
determine a boundary strength with respect to the boundary of the current block, and
filter the boundary of the current block based on the boundary strength.

11. The image decoding apparatus of claim 10, wherein, based on the boundary strength having a first value, the in-loop filtering on the boundary of the current block is not performed.

12. The image decoding apparatus of claim 1, wherein, based on the current subpicture being treated as a picture, the first flag for the current subpicture specifies that the in-loop filtering is not able to be performed across the boundary of the current subpicture.

13. An image encoding apparatus comprising:
a memory; and
at least one processor connected to the memory, the at least one processor configured to:
determine whether in-loop filtering is able to be performed across a boundary of a subpicture; and
perform the in-loop filtering on a boundary of a current block based on a result of determination,
wherein, based on the boundary of the current block being a boundary of a current subpicture including the current block, the in-loop filtering on the boundary of the current block is not performed, based on a first flag for the current subpicture specifying that the in-loop filtering is not able to be performed across the boundary of the current subpicture or the first flag for an adjacent subpicture adjacent to the boundary of the current block specifying that the in-loop filtering is not able to be performed across the boundary of the adjacent subpicture.

14. An apparatus for transmitting a bitstream for an image, the apparatus comprising:

at least one processor configured to obtain the bitstream generated by an encoding apparatus; and a transmitter configured to transmit the bitstream;

the bitstream is generated by:

determining whether in-loop filtering is able to be performed across a boundary of a subpicture; and performing the in-loop filtering on a boundary of a current block based on a result of determination, wherein, based on the boundary of the current block being a boundary of a current subpicture including the current block, the in-loop filtering on the boundary of the current block is not performed, based on a first flag for the current subpicture specifying that the in-loop filtering is not able to be performed across the boundary of the current subpicture or the first flag for an adjacent subpicture adjacent to the boundary of the current block specifying that the in-loop filtering is not able to be performed across the boundary of the adjacent subpicture.

* * * * *